United States Patent [19]
Park

[11] Patent Number: 5,757,909
[45] Date of Patent: May 26, 1998

[54] ILLEGAL VIEW AND COPY PROTECTION METHOD IN DIGITAL VIDEO SYSTEM AND CONTROLLING METHOD THEREOF

[75] Inventor: Tae Joon Park, Seoul, Rep. of Korea

[73] Assignee: LG Electronics, Inc., Seoul, Rep. of Korea

[21] Appl. No.: 562,047

[22] Filed: Nov. 22, 1995

[30] Foreign Application Priority Data

Nov. 26, 1994 [KR] Rep. of Korea ............... 31364/1994

[51] Int. Cl.⁶ .................................................. H04N 7/167
[52] U.S. Cl. .................................................. 380/5; 380/16
[58] Field of Search .................................... 380/5, 16

[56] References Cited

U.S. PATENT DOCUMENTS

| | | | |
|---|---|---|---|
| 4,908,834 | 3/1990 | Wiedemer | 380/5 |
| 5,237,610 | 8/1993 | Gammie et al. | 380/10 |
| 5,418,853 | 5/1995 | Kanota et al. | 380/5 |
| 5,461,674 | 10/1995 | Citta | 380/10 |

*Primary Examiner*—Gilberto Barrón, Jr.
*Attorney, Agent, or Firm*—John P. White; Cooper & Dunham LLP

[57] ABSTRACT

Illegal view and copy protection method in a digital video system for preventing an illegal user from viewing the digital video system and copying therefrom, by setting a descrambling method which decrypts split keystreams adopting a smart card, including a determination step for determining received data of having been scrambled; a reproduction step, a recording step, and a transporting step, wherein the reproduction step, the recording step and the transporting step can be performed simultaneously or selectively.

35 Claims, 16 Drawing Sheets

F I G.7
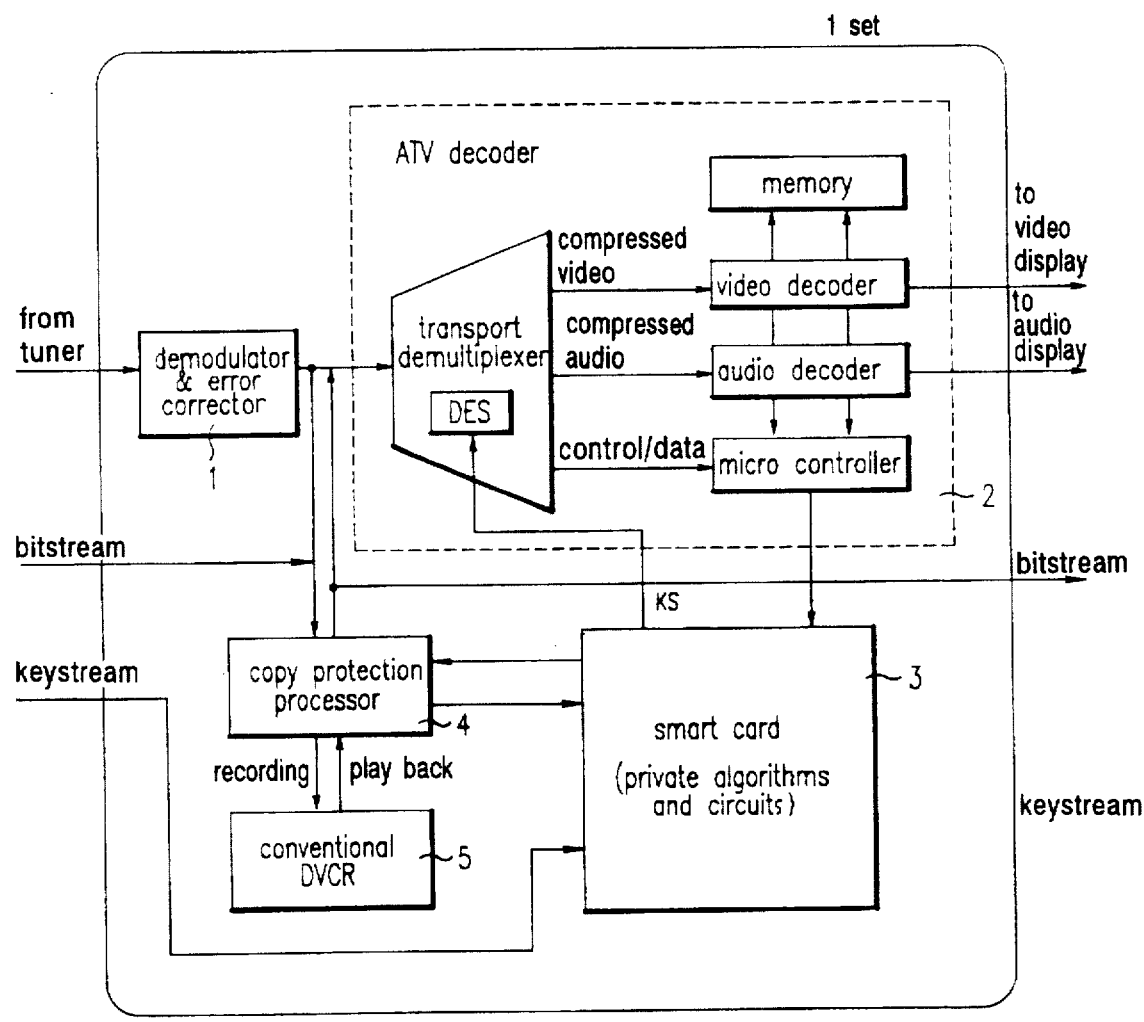

F I G.12
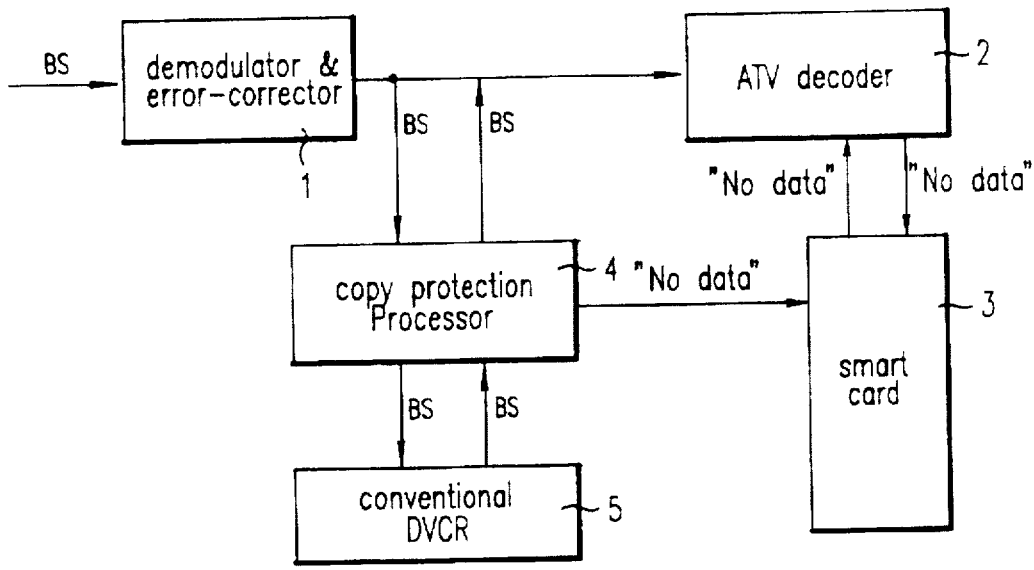
F I G.13
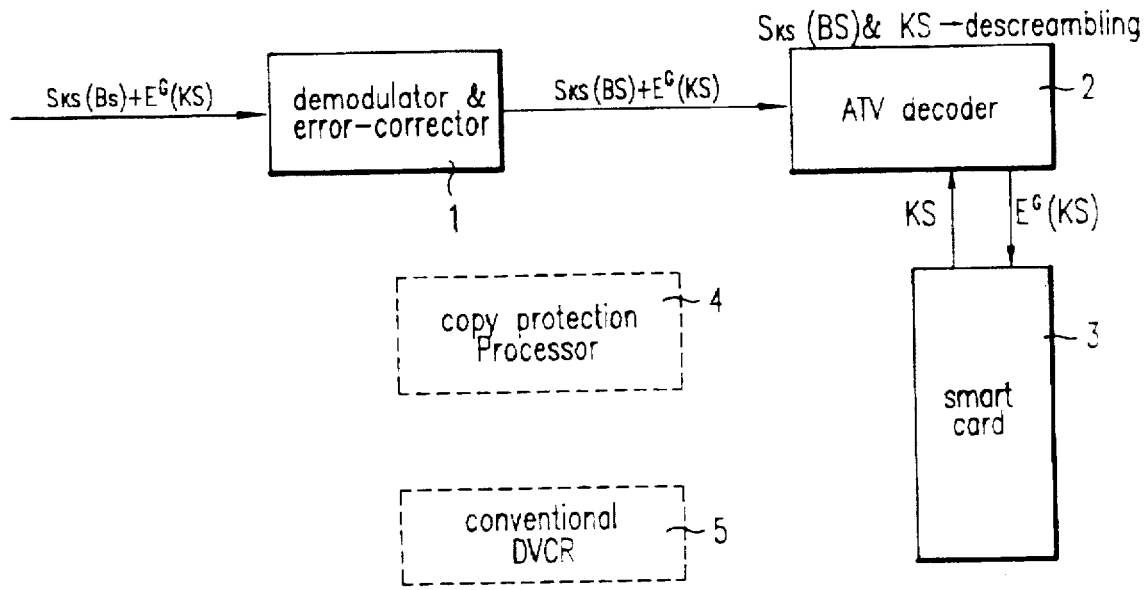

F I G.14
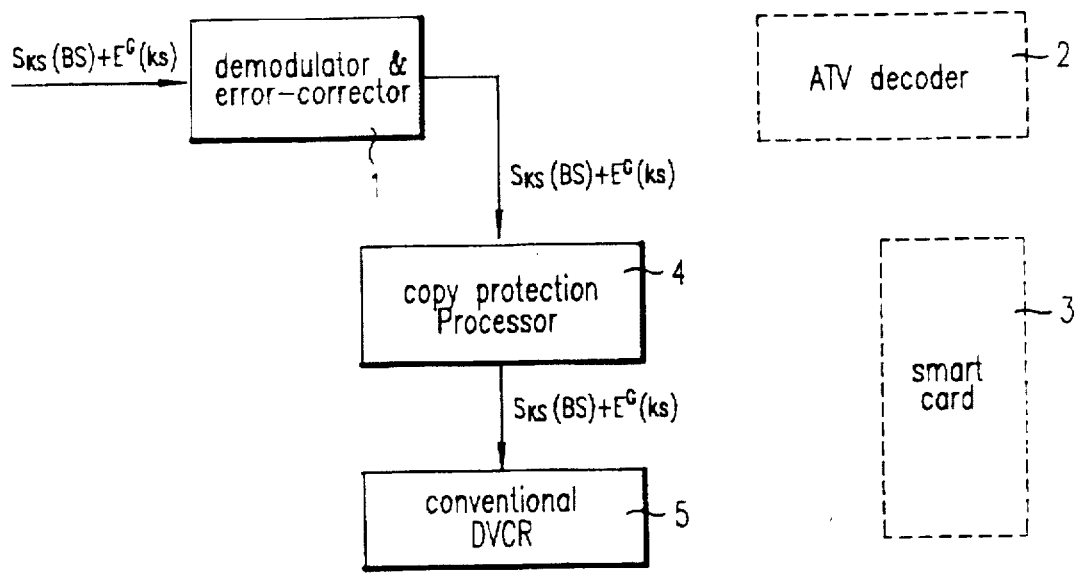
F I G.15
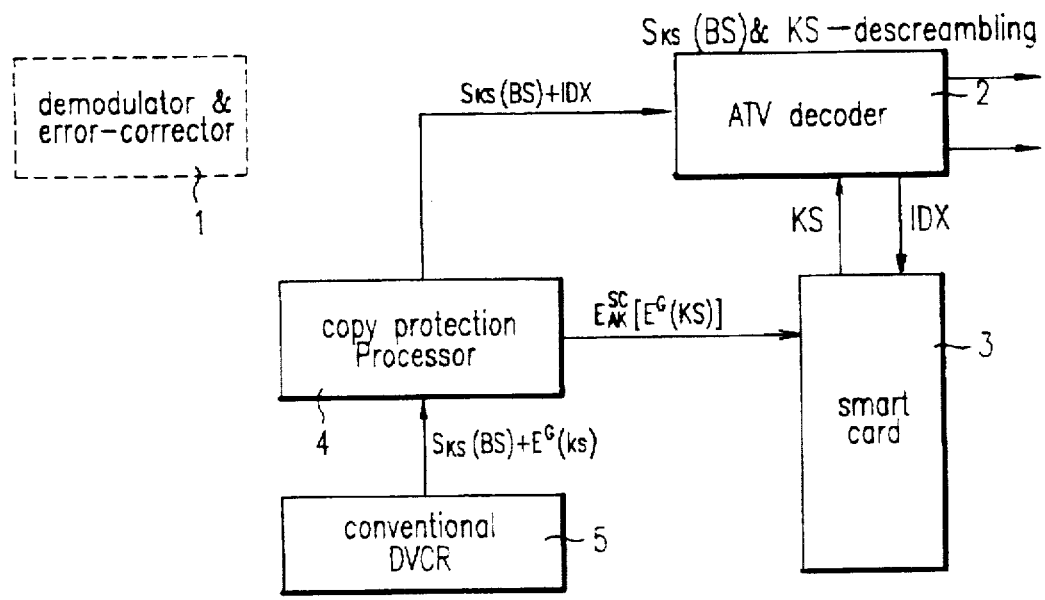

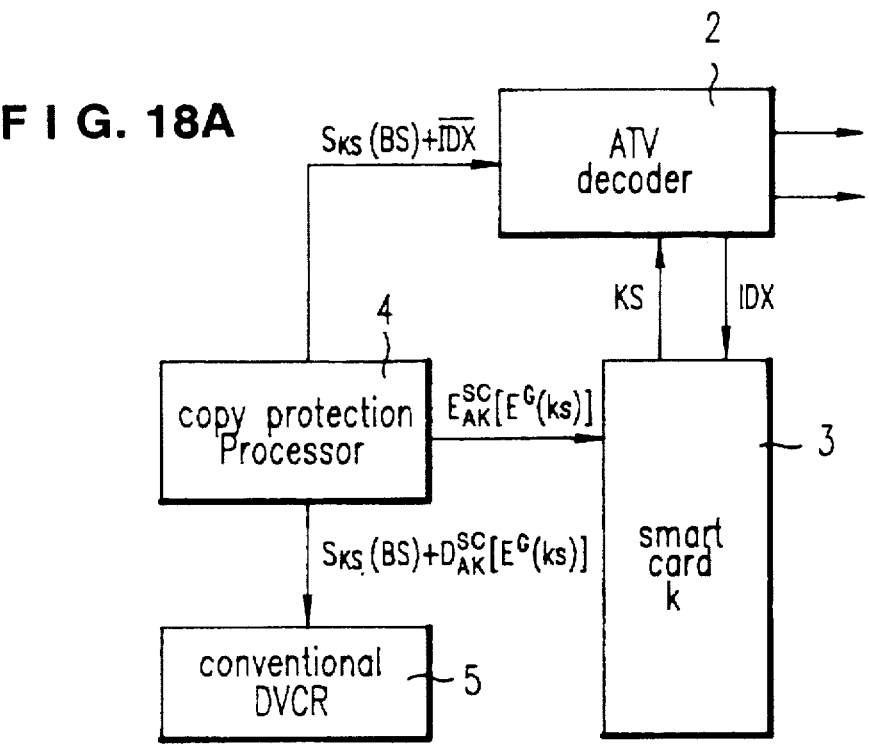
F I G. 18A
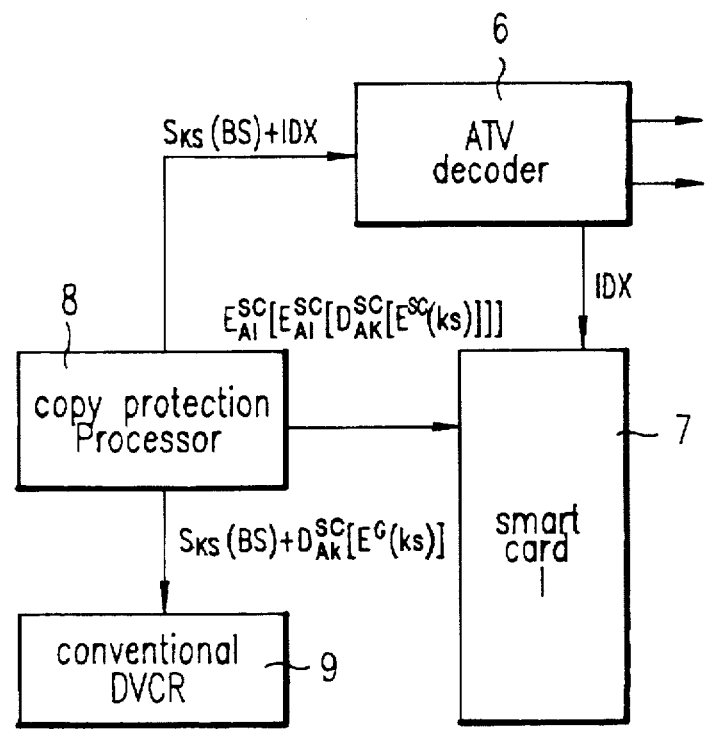
F I G. 18B

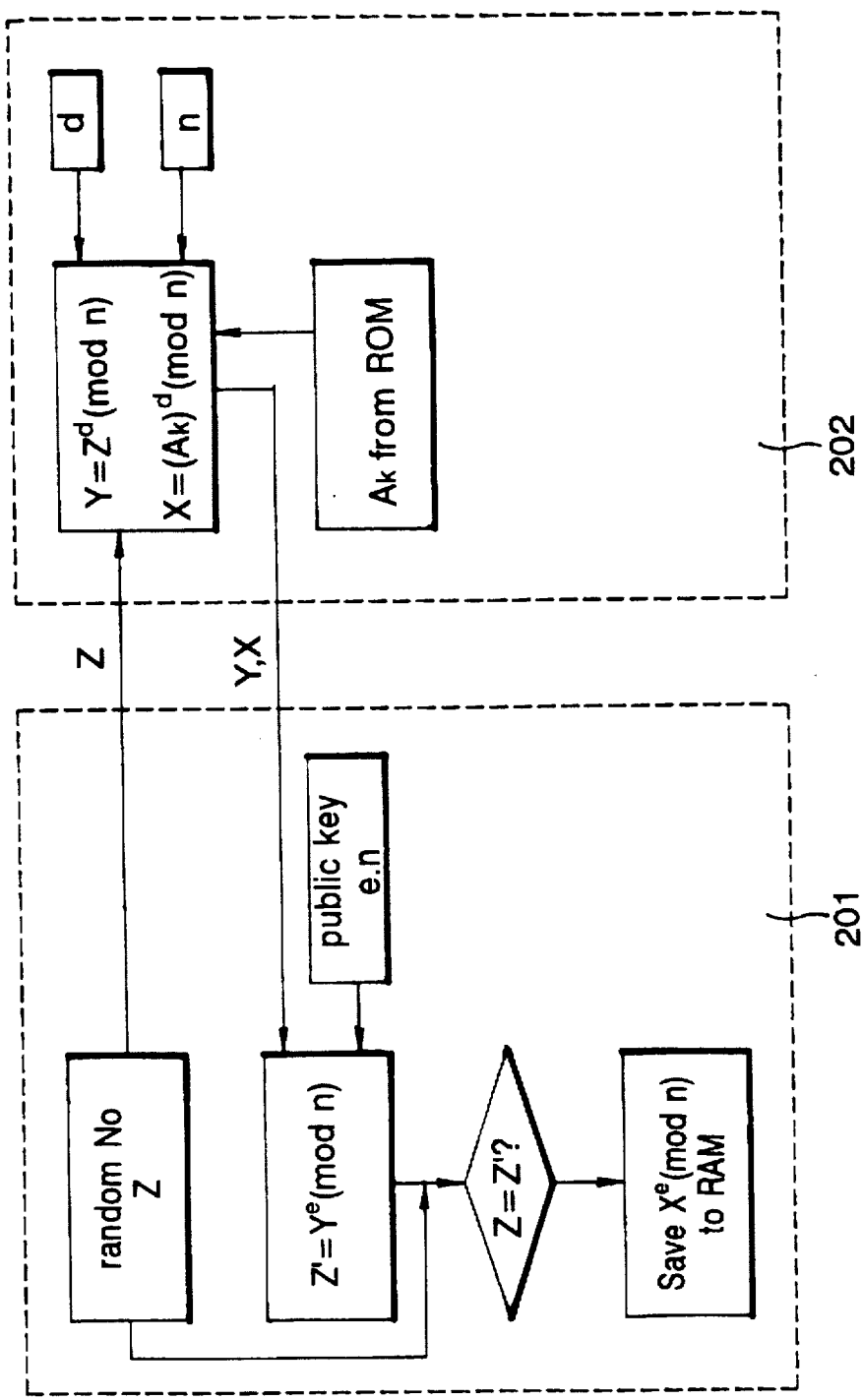
F I G. 21

ILLEGAL VIEW AND COPY PROTECTION METHOD IN DIGITAL VIDEO SYSTEM AND CONTROLLING METHOD THEREOF

BACKGROUND OF THE INVENTION

The present invention relates to an illegal view and copy protection technique for a digital video system, and more particularly, to an illegal view and copy protection method in a digital video system for preventing an illegal user from viewing the digital video system and copying therefrom, by setting a descrambling method which decrypts split key-streams adopting a smart card.

In a general digital video system, there has been a keen interest in implementing a conditional access (CA) system for an illegal viewing protection.

In such a CA system, a broadcasting signal is scrambled at charged channels such as in a cable television or a satellite broadcasting service to be broadcasted. Therefore, only a user who paid normally can view a program properly through descrambling.

For example, a satellite broadcasting receiver or a Grand Alliance (GA) system, which is a standard of an advanced television (ATV) in U.S.A. has a function for supporting a CA. Also, scrambling/descrambling apparatus, such as a video cipher manufactured by GI, which can be used for a satellite broadcasting, have been commonly used.

Video cipher manufactured by GI is generally used for the scrambling system for a CA system, which is based in U.S. Pat. No. 4,613,901 by Gilhousen, disclosing a system and method, in which a TV signal transported via a normal user's descrambler is scrambled in a charged TV system to be broadcasted and then is selectively descrambled in the user's descrambler. A video cipher system for performing a descrambling is implemented by adopting a smart card, which is disclosed in U.S. Pat. No. 5,111,504. This is implemented such that the system proposed by Gilhousen is partitioned into two parts, that is, an information processor corresponding to a descrambler and a security element which can be replaced by a smart card.

Therefore, by adopting the above method, the scrambling system is implemented as shown in FIG. 1, and the descrambling system is implemented as shown in FIG. 2.

In other words, a conventional illegal viewing protecting apparatus for a digital video system includes a scrambler 101 for scrambling a TV signal in accordance with a common category key (CK) and an initialization vector (PK) and outputting the scrambled TV signal ($SV_0$) and scrambling information $E_{U(D)}E_{U(S)}(CK)$ and $E_{CK}(PK)$, a smart card 103 for encrypting information for descrambling, A(D) and A(S), with respect to descrambling information U(S), and an information processor 102 for decrypting the information for descrambling, $E_{A(D)}[E_{A(S)}(WK)]$, to descramble the TV signal ($SV_0$) transported from scrambler 101 and restoring the same into original TV signal $DV_0$.

Here, A(D) is an authentication key of information processor 102, A(S) is an authentication key of smart key 103, U(D) is a unit key of information processor 102, and U(S) is a unit key of smart key 103.

At this time, scrambler 101 includes a first encrypter 111 for encrypting a common category key (CK) with respect to descrambling information U(D) and U(S), a second encrypter 112 for encrypting an initialization vector (PK) with respect to the common category key (CK), a third encrypter 113 for encrypting the initialization vector (PK) with respect to the output $E_{CK}(PK)$ of second encrypter 112, and a scrambling executing party 114 for scrambling a TV signal $V_i$ in accordance with the output WK of third encrypter 113.

The operation of the conventional apparatus having the aforementioned configuration will now be described.

First, in the case of transporting a TV signal in a transport system, scrambler 101 operates such that the common category key (CK) is encrypted with respect to the descrambling information U(D) and U(S) by first encrypter 111, the initialization vector (PK) is encrypted with respect to the common category key (CK) by second encrypter 112, the initialization vector (PK) is encrypted with respect to the output $E_{CK}(PK)$ of second encrypter 112 by third encrypter 113, to then be output to scrambling executing party 114.

At this time, scrambling executing party 114 scrambles the TV signal $V_i$ in accordance with the output WK of third encrypter 113. Here, the scrambling information WK is expressed in $E_{E_{CK}(PK)}(PK)$.

Accordingly, scrambler 101 transports information $E_{U(D)}E_{U(S)}(CK)$ encrypted with respect to the common category key (CK), the information $E_{CK}(PK)$ encrypted initialization vector (PK) and the scrambled TV signal $SV_0$, to information processor 102.

In case of descrambling the scrambled TV signal $SV_0$, smart card 103 encrypts the information WK necessary for descrambling with respect to authentication information A(D) of information processor 102 and its own authentication information A(S), and then generates the encrypted descrambling information $E_{A(D)}[E_{A(S)}(WK)]$ to information processor 102.

Accordingly, information processor 102 decrypts the encrypted descrambling information $E_{A(D)}[E_{A(S)}(WK)]$ generated from smart card 103 and descrambles the TV signal $SV_0$ transported from scrambler 101 using the encrypted descrambling information $E_{A(D)}[E_{A(S)}(WK)]$, thereby restoring the same into the original TV signal $DV_0$.

Here, the encryption in transporting the information between information processor 102 and smart card 103 is adopted for enhance the security from the illegal view and copy.

For example, the specification of a GA-HDTV system supports the CA system and includes various functions necessary for transport protocols.

These functions are flexible and useful in that they support all possible descrambling methods and key encryption methods, and bitstreams are selectively scrambled so that a CA function can be adopted in the unit of an element stream.

Here, the scrambling randomizes data bitstream according to information data, and the encryption converts information data in order to protect the information data from illegal users.

In other words, the CA system makes the transported data random and disables the illegal users' decoders to be decoded improperly by means of a scrambler but allows the legal users' decoders to decode the received TV broadcasting signals properly by supplying information for initializing a descrambler circuit.

The CA transport MPEG protocol for such operation is implemented by the format shown in FIG. 3 and supports the CA function as follows.

First, a transport-scrambling-control field of 2 bits notifies whether or not a transport stream is scrambled and which scrambling key is used.

Second, each data is inserted into the GA transport system using a transport-private-data field positioned within adaptation header of the transported stream, and encrypted scrambling information is stored in the field.

The CA transport MPEG protocol transports a transport header, a packetized elementary stream (PES) and audio and video data independently or concurrently. The transport protocol includes a header link header region, an adaptation header region and a payload region.

Here, the link header has a length of 4 bytes and the adaptation head has a variable length.

The transport-scrambling-control field is inserted into the link header. A field value of "00" is recognized as being not scrambled, "10" is recognized as being an even key, "11" is recognized as being an odd key, and "01" is recognized as being reserved.

The adaptation header includes a flag bit and transport-private-data field, and the flag bit includes transport-private-data flag of one bit. The PES header of the CA transport MPEG protocol shown in FIG. 3 is constructed as shown in FIG. 4.

A field for a digital storage media (DSM) such as a digital video cassette recorder (DVCR) exists in the PES header. Such a field include a PES header flag region having a length of 14 bits and a PES header field having a variable length. The PES header flag region includes a 1-bit copyright (CR) flag, a 1-bit original-or-copy flag, a 2-bit PD flag, a 1-bit TM flag and a 1-bit AC flag.

The PES header field has a variable length and its region is partially set by the PD, TM and AC flags contained in the PES header flag region.

In other words, PTS/DTS regions do not exist in the PES header field if the PD flag value is "00," PTS/DTS of 40 bits exist if the PD flag value is "10," PTS/DTS of 80 bits exist if the PD flag value is "11." A DSM trick mode does not exist if the TM flag value is "0," and the DSM trick mode becomes 8 bits if the TM flag value is "1." Also, if the AC flag is set to "1," an additional copy information field becomes 8 bits.

The scrambling information is transported by adopting the above-described format, and the descrambling process using the information is shown in FIG. 5.

Here, since the descrambling system decrypts the next encrypted key together with the key being used for the current descrambling, the descrambler stores at least two keys, that is, an odd key and an even key.

Also, the scrambling system sets a value of the transport-scrambling-control field within the link header according to the descrambling method of the current transport stream to then transport the same.

Accordingly, the descrambler determines an even key or an odd key according to the value of the transport-scrambling-control field of the decrypted transport head from the received data and then descrambles the received data to then be decrypted.

In other words, when the data having the format shown in FIG. 5 is transported and descrambler descrambles the $K_{2n-1}$-th frame with the odd key according to the value of the transport-scrambling-control field decrypted in smart card, smart card decrypts the transport-scrambling-control field of $K_{2n}$-th frame to be descrambled nest. These operations are sequentially performed.

An ATV decoder for performing the CA function may be implemented as shown in FIG. 6. The ATV decoder 110 incorporates a descrambler necessitating a fast operation into a transport demultiplexer 105 and performs the descrambling by a DES algorithm or a stream cipher algorithm using a PN sequence. The key encrypted by ATV decoder 110 is decrypted in smart card 103. Here, the interface between smart card 103 and ATV decoder 110 is executed in accordance with the ISO-7816 standard specification.

In other words, in the embodiment shown in FIG. 6, a signal received from a tuner is demodulated in a demodulator & error corrector 104 and then the errors generated during transport are corrected by an RS decoding and are input to transport demultiplexer 105 of ATV decoder 110 to then be descrambled.

At this time, a microcontroller 109 operates descrambled control and data and transports the encryption information for descrambling to smart card 103. Smart card 103 decrypts the transported encryption information to transport the same to ATV decoder 110.

At this time, transport demultiplexer 105 restores a compressed video and audio signals, control signal and data according to the descrambling information.

Accordingly, a video decoder 107 extends the compressed video signal and temporarily stores the extended signal in a memory 106 and then outputs the stored data to display a video. An audio decoder 108 extends the compressed audio signal and then reproduce an audio.

Also, microcontroller 109 reads the control signal and data output from transport demultiplexer 105 and controls the operations of video decoder 107 and audio decoder 108.

Among various methods used for encryption, a block-cipher algorithm such as DES and a stream-cipher algorithm using the PN sequence are most widely used.

However, since these methods perform encryption and decryption only with a encrypted signal, a key management and a key distribution are hard to accomplish.

Therefore, in order to solve the above problem, a public key encryption method has been proposed in U.S. Pat. No. 4,200,770. This method performs encryption using a public key and performs decryption using his own secret key.

The public key encryption method has been improved and implemented as an encryption system, which is known as an RSA encryption algorithm disclosed in U.S. Pat. No. 4,405, 829. However, this public key encryption method is not suitable for fast encryption.

The CA system aims to protect an illegal viewing. However, programs distributed through a DSM such as a DVCR cannot be protected from the illegal copying.

In other words, the protection of the program distributed by a recording medium such as DSM means the illegal copying protection. However, the copy protection method adopted in a conventional analog VCR system is difficult to be adopted in a digital storage media. Also, research into the copy protection method for DSM has not yet been developed well.

SUMMARY OF THE INVENTION

To solve the above problems of the conventional art, it is an object of the present invention to provide illegal view and copy protection method in a digital video system and a controlling method thereof for protecting illegal view and copy, in which encrypted key is decrypted in a smart card by transporting a scrambled bitstream and the encrypted key used for scrambling to different paths and the bitstream is descrambled in accordance with the information, and normal decoding is not performed only by the bitstream.

It is other object of the present invention to adopt a smart card in the CA system so that the charge is automatically checked to enforce the pay per view (PPV) function and to upgrade the performance of the system by adding various functions by way of replacement of the smart card.

It is another object of the present invention to reduce the key quantity of the data to be protected greatly by splitting the transported data and to make the system inoperative with an illegal smart card by automatic performance of authentication and key exchange during power-on or connection to a digital recording/reproduction device for recording, thereby increasing the reliability of the protection function.

According to one aspect of the present invention, there is provided an illegal view and copy protection method in a digital video system, including: a determination step for determining received data of having been scrambled; a reproduction step, if the received data was determined to be scrambled data in the determination step, splitting the scrambled data into a bitstream and a keystream for decrypting the split keystream for reading in key information, and descrambling the split bitstream according to the read in key information for displaying the bitstream on a display; a recording step for, if the received data was determined to be scrambled data in the determination step, recording the scrambled data on a recording medium either as scrambled data of a bitstream and a keystream according to a recording or copying mode, or after splitting the scrambled data into a bitstream and a keystream, encrypting the split keystream, and mixing the encrypted keystream with the bitstream; and a transporting step, if the received data was determined to be scrambled data in the determination step, splitting the scrambled data into a bitstream and a keystream for transporting the split keystream either after decrypting the split keystream with respect to key information from recording side according to a PPC mode or a back-up copy mode, or after decrypting the split keystream two times with respect to key information of its own and key information from recording side, thereby the reproduction step, the recording step and the transporting step can be performed simultaneously or selectively.

According to other aspect of the present invention, there is provided an illegal view and copy protection method in a digital video system, including: a reproduction step, on reception of scrambled data, splitting the scrambled data into a bitstream and a keystream for decrypting the split keystream for reading in key information, and descrambling the split bitstream according to the read in key information for displaying the bitstream on a display; and a recording step for, on reception of scrambled data, recording the scrambled data on a recording medium as scrambled data of a bitstream and a keystream; thereby the reproduction step and the recording step can be performed simultaneously or selectively.

According to another aspect of the present invention, there is provided an illegal view and copy protection method in a digital video system, including: a determining step for determining the mode of the keystream being a back-up copy mode or a PPC mode; a first transportation step for, if the mode was determined to be a PPC mode in the determining step, decrypting the keystream with respect to key information from a recording side for transporting the keystream; a first recording step for encrypting the keystream transported in the first transportation step with respect to the key information from the recording side and inserting the encrypted keystream into a position corresponding to an index code, for recording the keystream together with a bitstream on a recording medium; a second transportation step for, if the mode was determined to be a back-up copy mode in the determining step, decrypting the keystream for two times with respect to its own key information and the key information from the recording side for transporting the keystream; and a second recording step for encrypting the keystream transported in the second transportation step with respect to the key information from the recording side and inserting the encrypted keystream into the position corresponding to the index code, for recording the keystream together with the bitstream on a recording medium.

According to further aspect of the present invention, there is provided an illegal view and copy protection method in a digital video system, including: a 'PPC' mode reproduction step for, having determined the recording medium being a 'PPC' recording medium on detection of a keystream at reproduction from a recording medium, encrypting the keystream with respect to its own key information and decrypting the keystream with respect to its own key information for reading in the key information, for descrambling the bitstream using both the read in key information and an index code; and a 'back-up copy' mode reproduction step for, having determined the recording medium being a 'back-up copy' recording medium on detection of a keystream decrypted with respect to its own key information at reproduction from a recording medium, encrypting the keystream for two times with respect to its own key information and the key information from a recording side and decrypting the keystream with respect to its own key information for reading in the key information, for descrambling the bitstream using both the read in key information and an index code.

According to still another object of the present invention, there is provided an illegal view and copy protection device in a digital video system, including: demodulating & error correcting means for modulating/demodulating an analog broadcasting signal and RS-decoding said signal; copy protection processing means for transporting the output of said demodulating & error correcting means to a digital recording/reproduction device, splitting the scrambled recording signal reproduced from said digital recording/ reproduction device into a bitstream and a keystream, and encrypting the split keystream; decoding means for descrambling the bitstream from said demodulating & error correcting means or the copy protection processing means according to descrambling information; and a smart card for decrypting the encrypted keystream of said copy protection processing means for applying to said decoding means as descrambling information.

According to still another object of the present invention, there is provided an illegal view and copy protection device in a digital video system, including: first copy protection processing means for splitting reproduction data from a first digital recording/reproduction device into a bitstream and a keystream and encrypting the split keystream; first and second smart cards for decrypting encrypted keystream from said first copy protection processing means with respect to its own key information and the key information from a recording side; and second copy protection processing means for encrypting the keystream from the first smart card transported through the second smart card with respect to its own key information and transporting the encrypted keystream together with the split bitstream to a second digital recording/reproduction device, for recording on a recording medium.

In the present invention, the copy protection processing means includes a RAM for storing intrinsic key information of the smart card, an algorithm storage memory for storing an encryption algorithm, and a processor for executing an encryption program of the algorithm storage memory with the key information of the RAM.

Aforementioned copy protection processing means includes a CA function as well as an all round program copyright protection function inclusive of illegal viewing protection and illegal copying protection.

In the present invention, the smart card includes a first algorithm storage memory for storing a decryption algorithm program for a bitstream, a second algorithm storage memory for storing a decryption algorithm program of its own key information, a ROM for storing its own key information, and a RAM for temporarily storing key information of another smart card.

BRIEF DESCRIPTION OF THE DRAWINGS

The above objects and advantages of the present invention will become more apparent by describing in detail a preferred embodiment thereof with reference to the attached drawings in which:

FIG. 7 is a block diagram of an illegal view and copy protection apparatus according to the present invention;

FIGS. 12 through 18A–18B illustrate the connections state of the present invention;

FIG. 21 shows the flow of signals for key exchange and authentication according to the present invention.

DETAILED DESCRIPTION OF THE INVENTION

The present invention is applicable to all recording/reproduction devices that can record and reproduce a digital signal, and for the sake of convenience of explanation, descriptions shown hereinafter is for an embodiment in a case of DVCR, as an example.

Accordingly, as shown in FIG. 7, the illegal view and copy protection apparatus in a digital video system according to an embodiment of the present invention, includes a demodulator & error corrector 1 for modulating/demodulating an analog broadcasting signal and RS-decoding the signal, an ATV decoder 2 for descrambling the output of demodulator & error corrector 1 according to descrambling information, a copy protection processor 4 for splitting the scrambled recording signal into a bitstream and a keystream and encrypting the split keystream, and a smart card 3 for decrypting the split and encrypted keystream of copy protection processor 4 and the index code of ATV decoder 2 and outputting descrambling information KS to ATV decoder 2.

Figure 1:
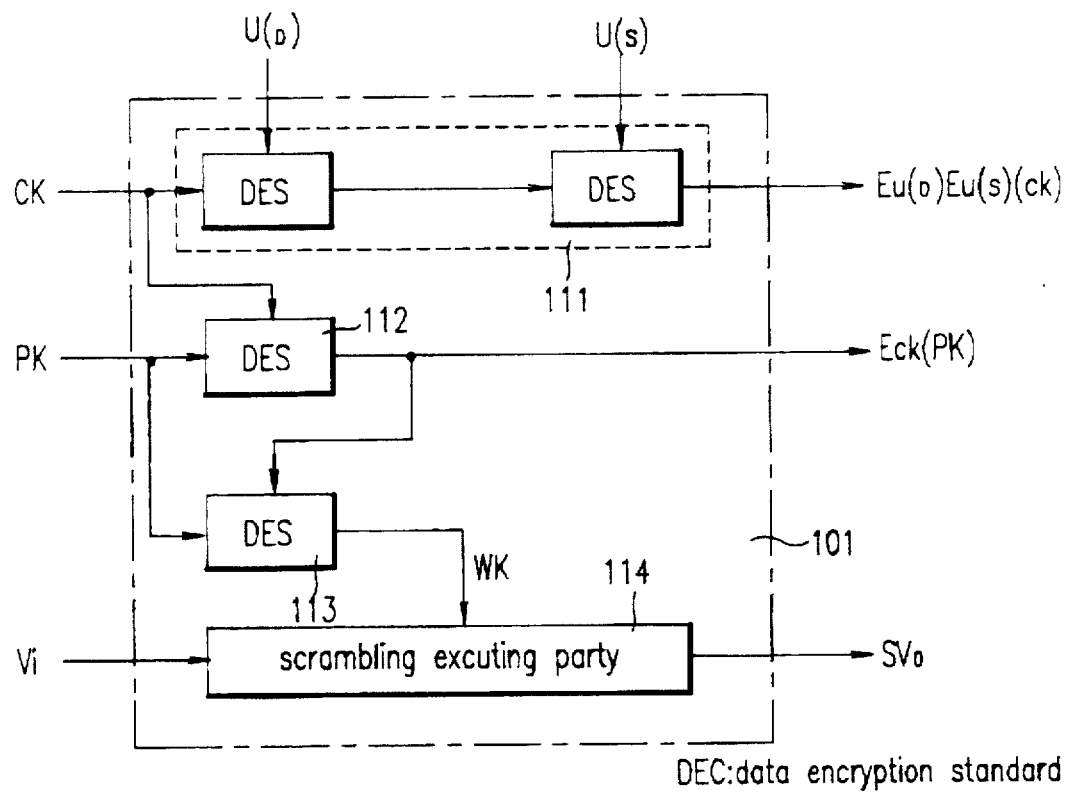
FIG. 1 is a block diagram of a general scrambler.
Figure 2:
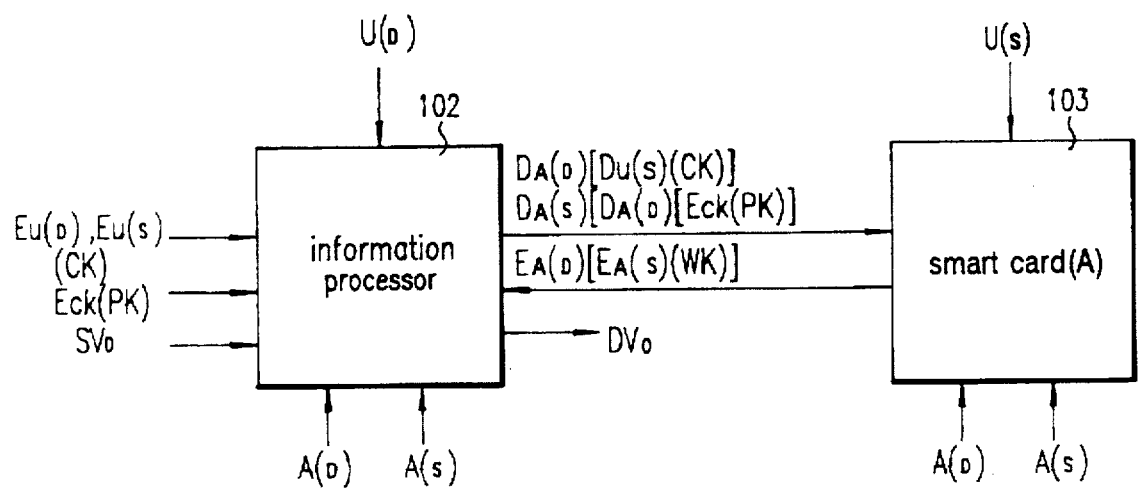
FIG. 2 is a block diagram of a general descrambler.
Figure 3:
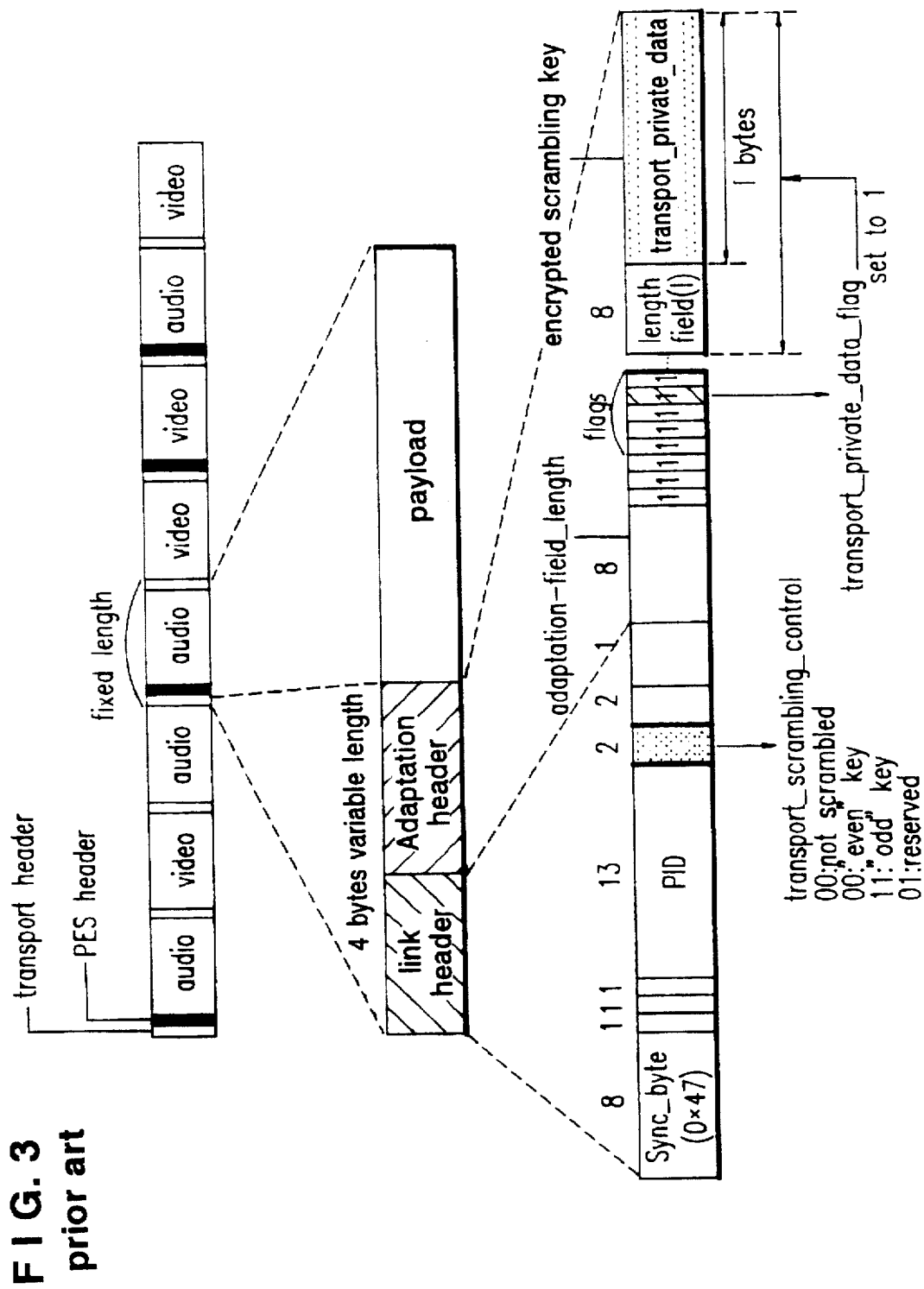
FIG. 3 illustrates a transport format.
Figure 4:
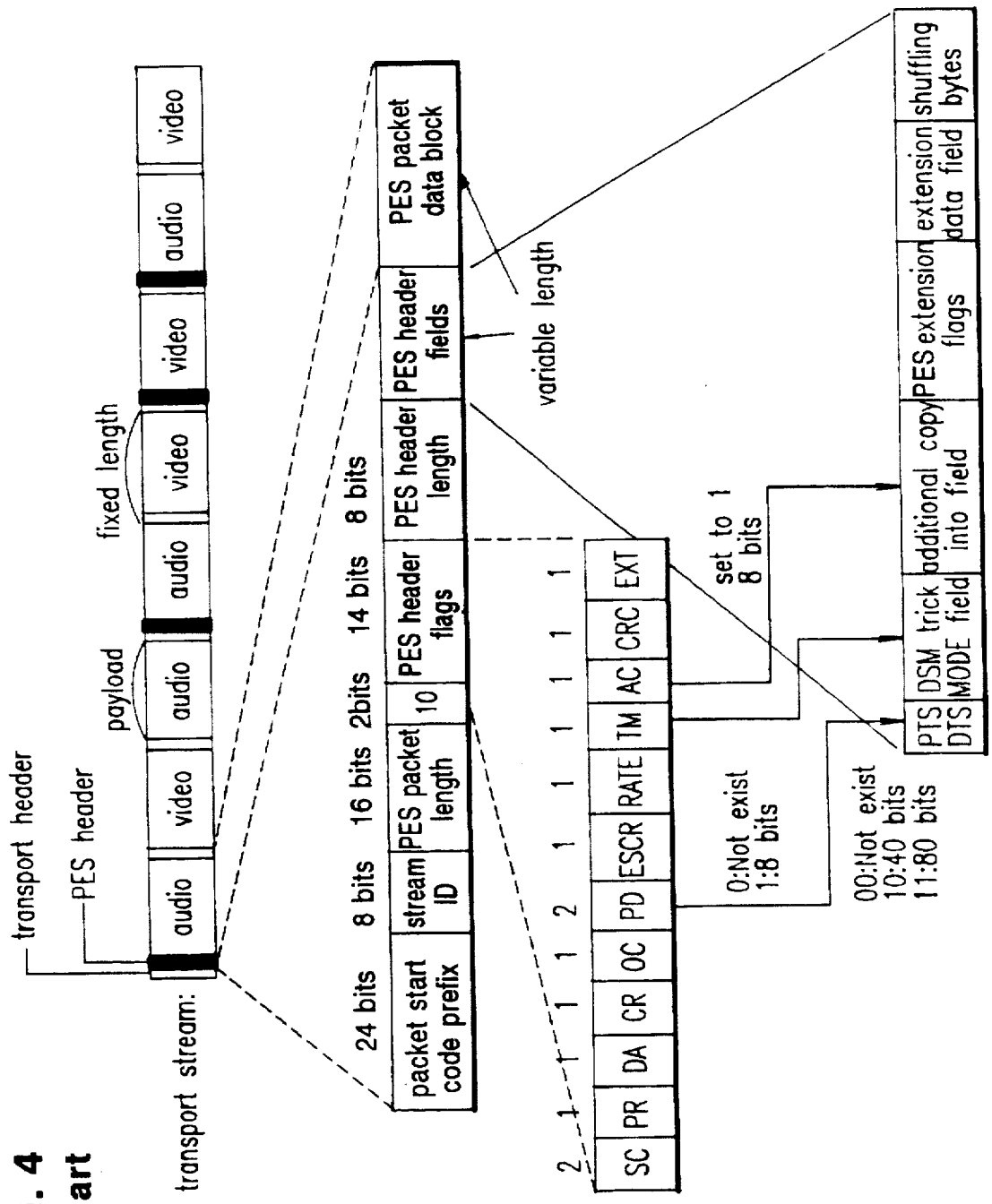
FIG. 4 illustrates a PES header shown in FIG. 3 in detail.
Figure 5:
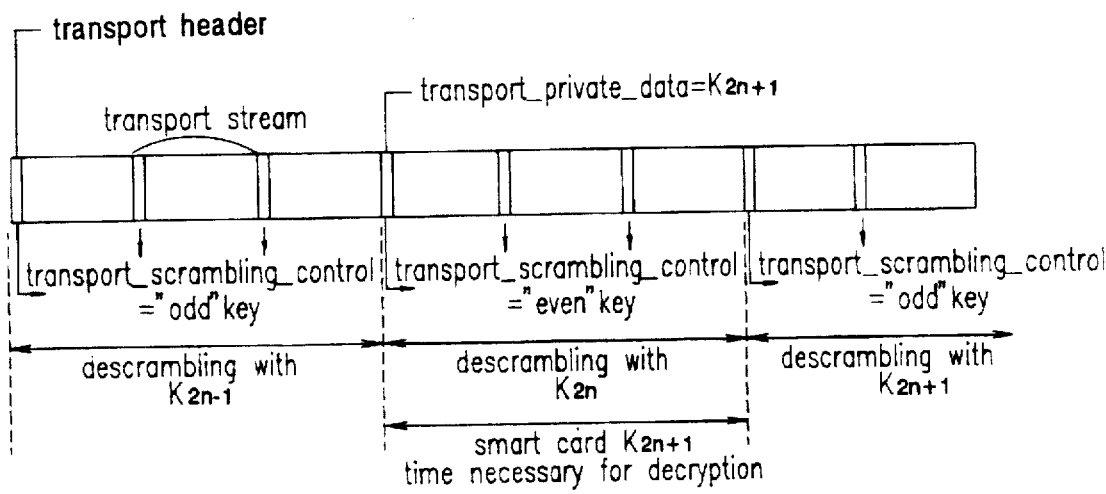
FIG. 5 illustrates the transport format by key distribution.
Figure 6:
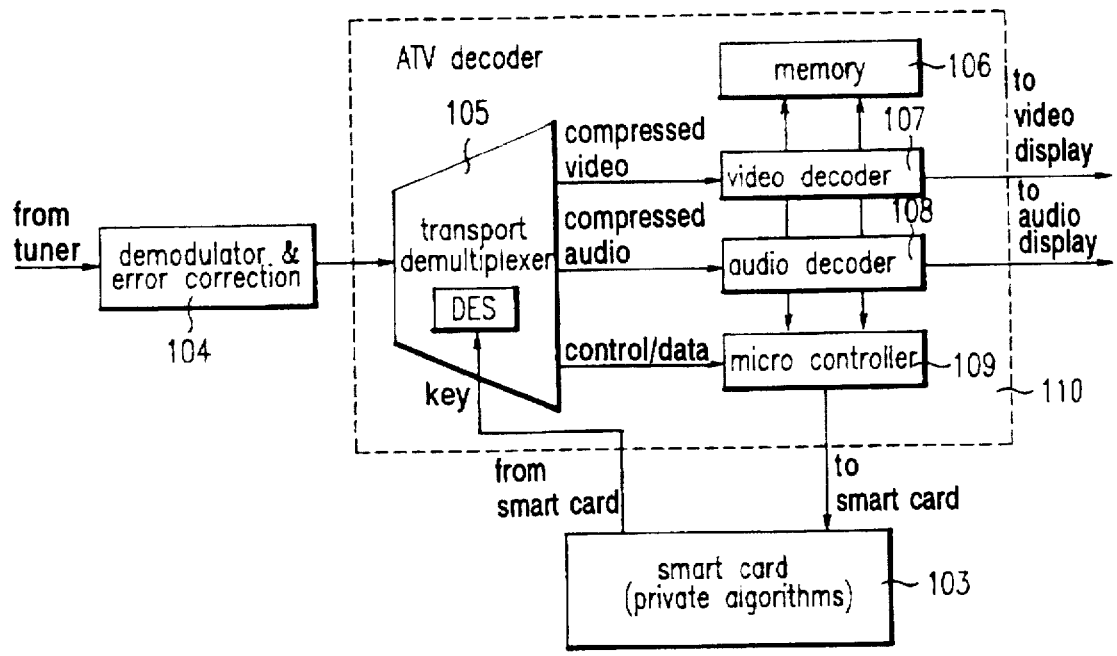
FIG. 6 is a block diagram of a conventional ATV decoder.
Figure 8:
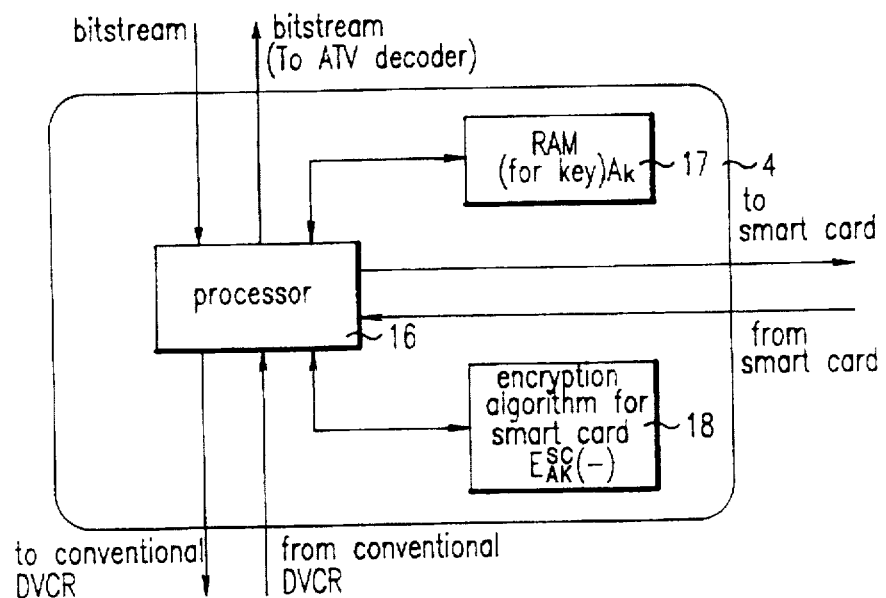
FIG. 8 is a detailed block diagram of the copy protection apparatus shown in FIG. 7.

Copy protection processor 4, as shown in FIG. 8, includes a RAM 17 for storing intrinsic key information of the smart card, an algorithm storage memory 18 for storing an encryption algorithm, and a processor 19 for executing an encryption program of algorithm storage memory 18 with the key information of RAM 17.

Figure 9:
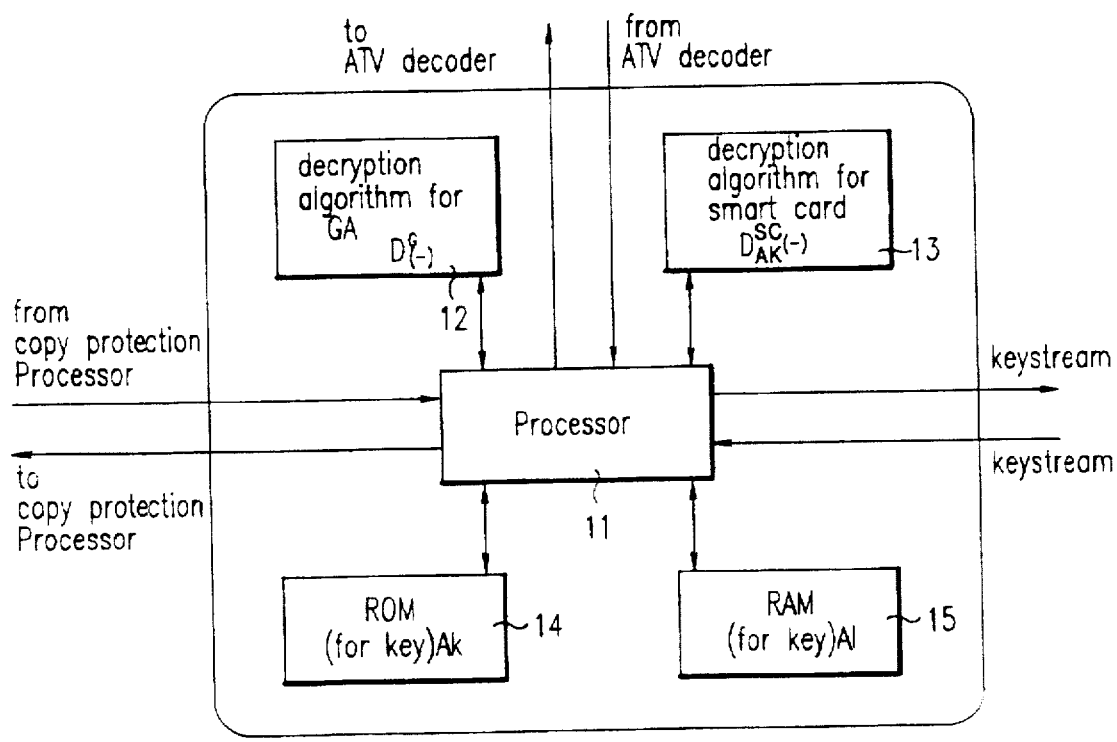
FIG. 9 is a detailed block diagram of the smart card shown in FIG. 7.

Smart card 3, as shown in FIG. 9, includes a first algorithm storage memory 12 for storing a decryption algorithm program for a bitstream, a second algorithm storage memory 13 for storing a decryption algorithm program of its own key information, a ROM 14 for storing its own key information, a RAM 15 for temporarily storing key information of another smart card, and a processor 11 for executing encryption or decryption with the storage algorithm of first and second algorithm storage memories 12 and 13 with respect to the key information stored in ROM 14 or RAM 15.

At this time, processors 11 and 16 may be constructed by wired logic or may adopt a microprocessor. In case of adopting the microprocessor, the encryption algorithm for a smart card may be incorporated in a program.

The operation and effect of the present invention constructed as stated above will now be described.

Figure 11A:
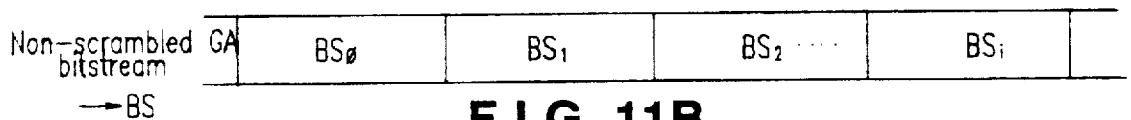
FIGS. 11A–11F illustrates the format of the respective bitstreams.
Figure 11B:
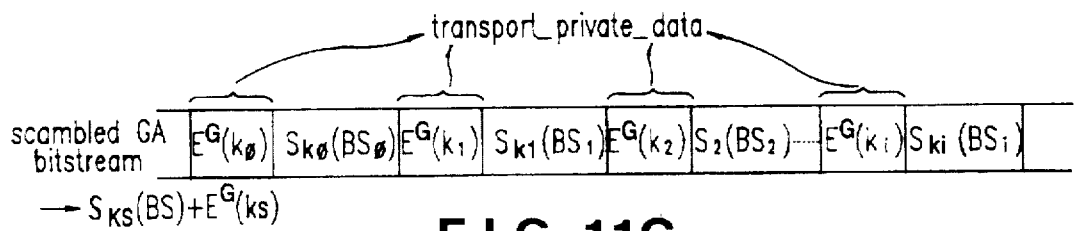
Figure 11C:
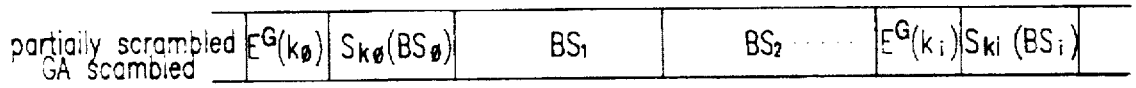
Figure 11D:
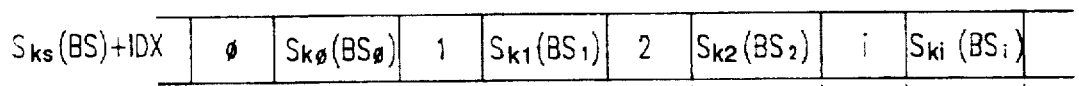
Figure 11E:
Figure 11F:

In the present invention, a GA bitstream is transported in the format as shown in FIGS. 11A through 11C, in which FIG. 11A shows a unscrambled format, FIG. 11B shows a scrambled format with respect to a bitstream, and FIG. 11C shows a format in which the bitstream is selectively scrambled.

In the present invention, if the GA bitstream is scrambled, it is assumed that a protection of any kind will be applicable.

Figure 10:
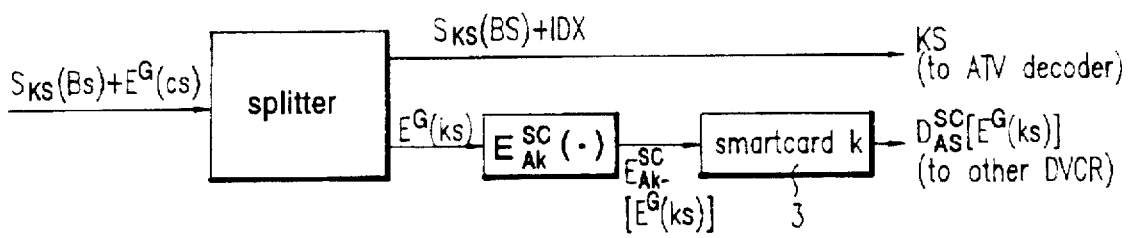
FIG. 10 illustrates the splitting of the bitstream shown in FIG. 8.

Therefore, if scrambled stream data $S_{KS}(BS)+E^G(KS)$ of the format shown in FIG. 11B or 11C is input to copy protection processor 4, a splitter shown in FIG. 10 splits the stream data into bitstream $S_{KS}(BS)+IDX$ and keystreams $E^G(KS)$. Then, a recording mode is performed to encrypt again the split keystreams $E^G(KS)$ to then be transported to smart card 3.

Here, as shown in FIG. 11C, if the bitstreams are partially scrambled, the illegal view and copy protection function is adoptable only to the scrambled portion, thereby performing a partial protection function.

First, when non-scrambled bitstreams are transported as shown in FIG. 11A, even if the bitstreams modulated/demodulated and decrypted in demodulator & error corrector 1 are input to copy protection processor 4, the data is not transported to smart card 3. Either, ATV decoder 2 to which the bitstreams of demodulator & error corrector 1 are input does not transport the data to smart card 3 but decrypts the bitstream.

Therefore, there is no restriction in view and copy.

Here, the signal input from a tuner to demodulator & error corrector 1 and the video and audio signals output from ATV decoder 2 are analog signals. The signal output from tuner is a VSB-modulated signal from the GA-bitstream.

Among input/output signals, bitstreams and keystreams are digital signals for DVCR.

At this time, if the recording is performed, the bitstreams are recorded onto DVCR and the recorded bitstreams are played back from a general DVCR.

In other words, even if non-scrambled MPEG bitstreams are input to copy protection processor 4 and passes through splitter as shown in FIG. 10, there is no data transported to smart card 3 due to no key information, thereby allowing a free view and copy.

Also, when the recording or copy protection functions are executed in the present invention, the split bitstreams and keystreams are transported to different lines from each other. The information on the copy protection method is transported with an additional copy information field within the PES header.

At this time, even if the scrambled bitstreams having no encrypted key are transported to an illegal user of the public channels, the descrambling is not executed properly in the state where the key information is removed.

Also, the split key is again encrypted to be transported. Thus, if there is no decryption algorithm, bitstreams cannot be descrambled.

Therefore, in the present invention, an arbitrary field is used in the MPEG transport protocol for the illegal view and copy protection, in which scrambling-executed bitstreams adopts the copy protection function.

First, if transport-scrambling-control field is changed into a "not-scrambled" mode, ATV decoder 2 does not execute descrambling, so that the illegal user cannot operate the field.

In such copy protection method, copy protection or free-copy function is determined by the transport-scrambling-control field. Therefore, the illegal user cannot release the copy protection function only by manipulating the field.

Next, the illegal user may modify the additional copy information field within the PES header, which converts the protection method. This method does not remove the protection method itself, which does not cause a noticeable damage to the copy protection function.

The copy protection method supported by the present invention having the above features includes a "no copy" method, a "pay-per-copy (PPC)" method, and a "back-up copy" method, with the default of a pay-per-view (PPV) function and a pay-per-play (PPP) function.

Here, the "no copy" method makes it completely difficult to copy with another video tape. The "PPC" method is to pay per one copy. The "back-up copy" method allows a video tape played back from a first DVCR and copied from a second DVCR to be displayed normally only in the first DVCR but not in the second DVCR.

The copy protection method according to the present invention and the flow of the corresponding MPEG bitstreams will now be described with reference to FIGS. 19 through 21.

Figure 19A:
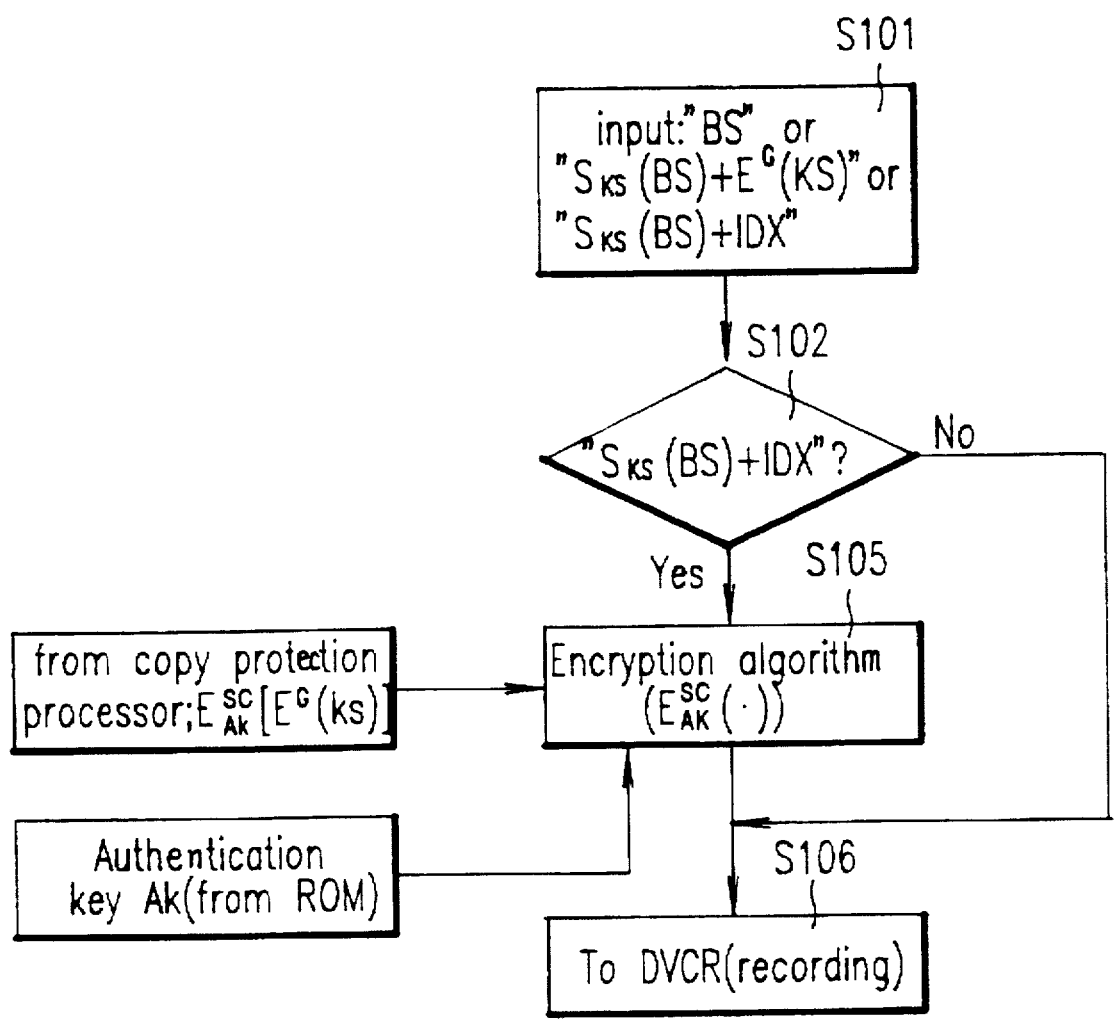
FIGS. 19A–19B and 20 show the flow of signals for operation of the present invention.
Figure 19B:
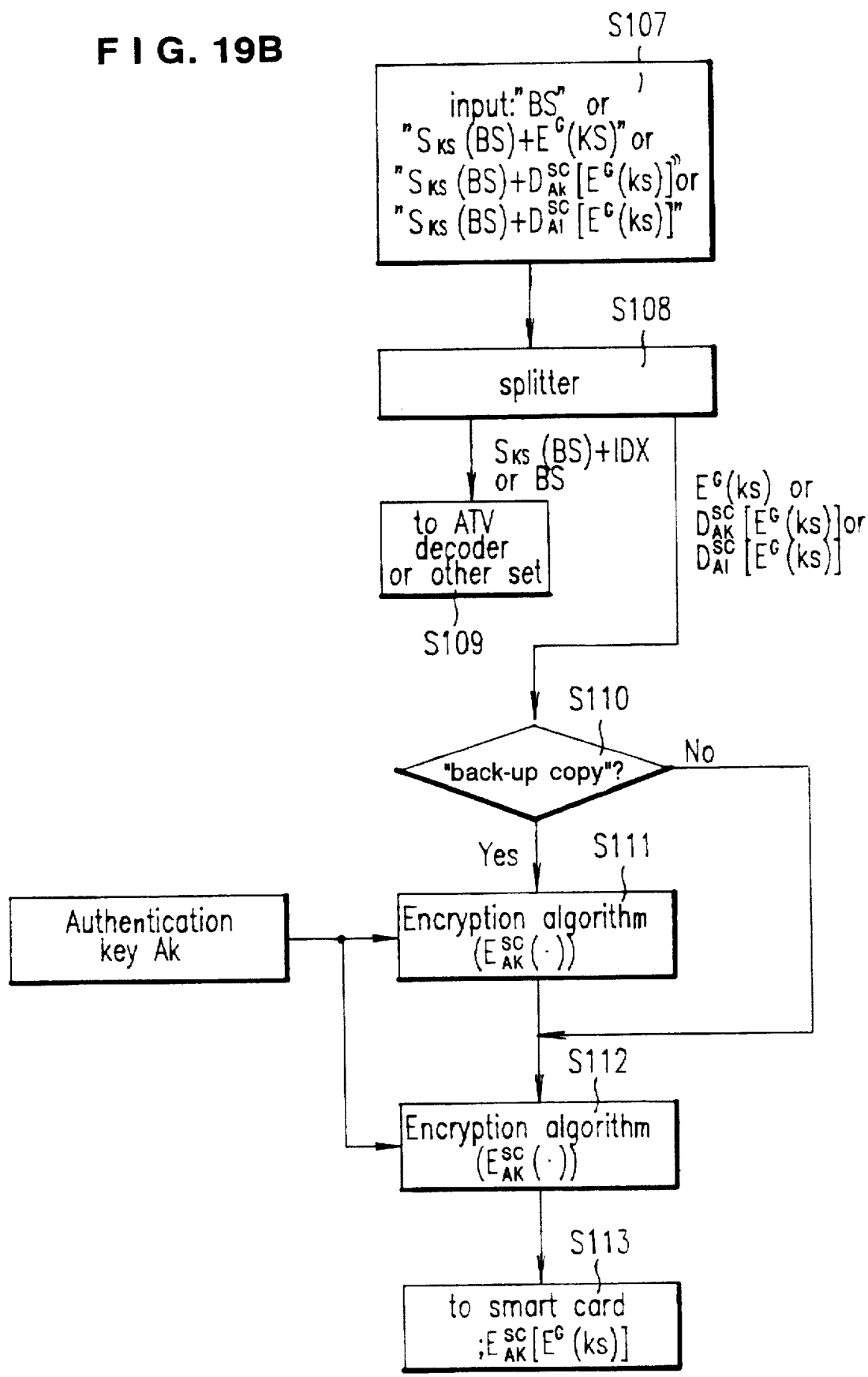
Figure 20:
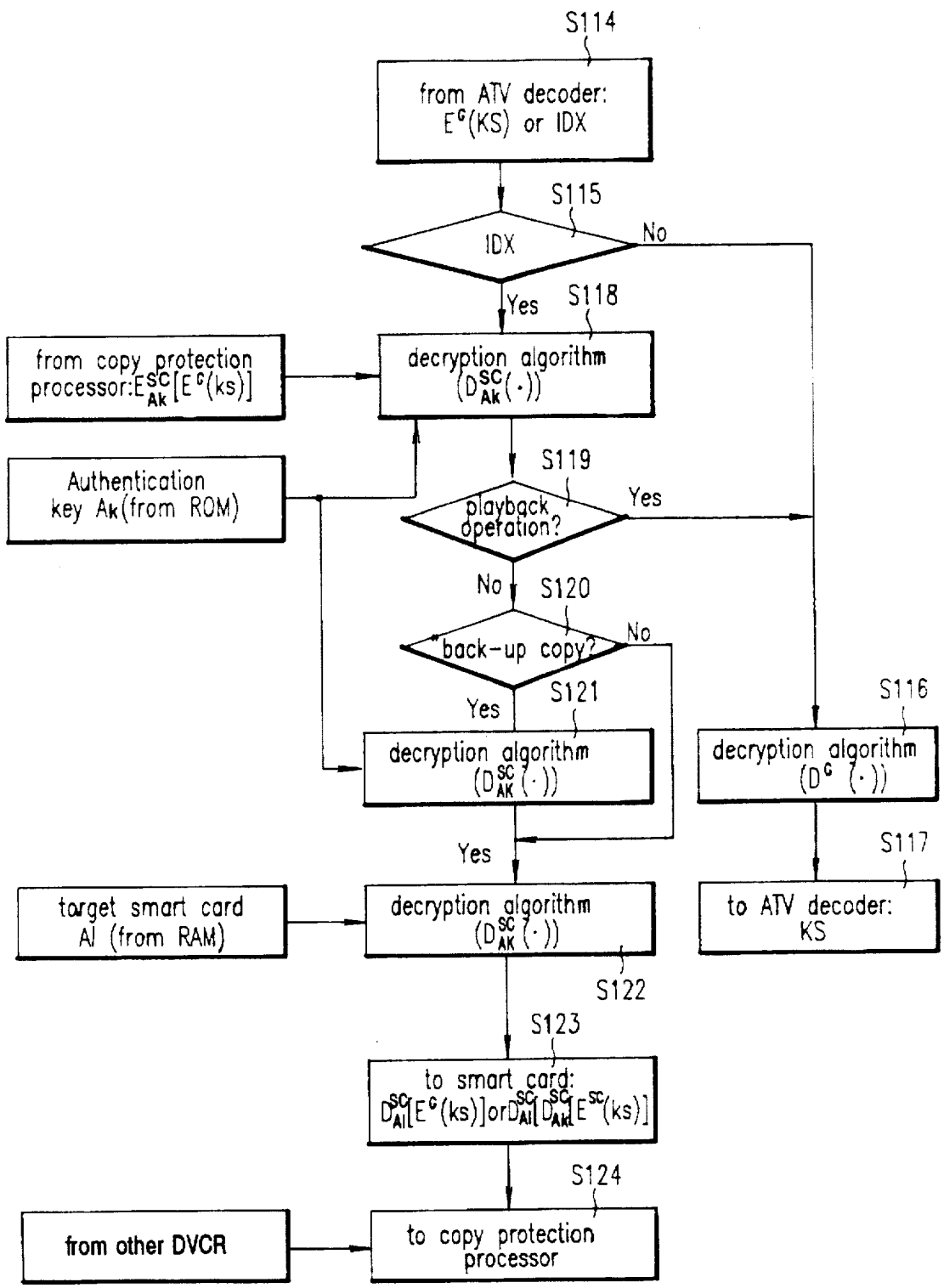

Here, FIG. 19 shows the flow of signals for operation of the copy protection processor during recording or playback mode, FIG. 20 shows the flow of signals for operation of the smart card corresponding to the copy protection processor, and FIG. 21 shows the flow of signals for key exchange and authentication during recording or playback operation.

First, referring to FIG. 19A, copy protection processor 4 to which bitstreams are input checks the presence or absence of key information to determine whether it is scrambled or not, and determines whether the recording is the first recording or the copy recording if the key information is scrambled (S101). In other words, in the case of scrambled data, it is detected whether the data is transported in the streams of $S_{KS}(BS)+IDX$ format by splitting the data into bitstreams $S_{KS}(BS)$ and keystreams $E^G(KS)$. If the streams of $S_{KS}(BS)$ +IDX format are detected, the recording is determined to be the copy recording. If not detected, the recording is determined to be the first recording (S102).

Accordingly, if the recording is determined to be the first recording, the mixed streams $S_{KS}(BS)+E^G(KS)$ of bitstreams and keystreams are recorded onto a tape (S106). If the recording is determined to be the copy recording, the bitstreams $S_{KS}(BS)+IDX$ with keystreams $E^G(KS)$ split, are transported to copy protection processor 8 of recording side and the keystreams $E^G(KS)$ are again encrypted with respect to the key information Ak (S105). Then, the encrypted keystreams $E_{SC}^{AK}[E^G(KS)]$ are transported to smart card 7 of recording side via smart card 3, thereby allowing the recording onto the tape in a VCR 9 of recording side (S106).

On the contrary, FIG. 19B shows the signal flow in the case of the playback of the recorded tape with the same signal flow as shown in FIG. 19A, in which copy protection processor 4 splits and determines keystreams (S108) if bitstreams played back from VCR are input (S107), thereby determining whether the recording function is a "back-up copy" or not (S110).

At this time, in step S110, the tape is determined as a general recording tape, if there is no key information, and the tape is determined as the first recording tape if encrypted keystreams $E^G(KS)$ are detected. Also, if the keystream $D_{SC}^{Ak}[E^G(KS)]$ encrypted with respect to its own key information Ak, the tape is determined as the recording tape of PPC function. If the keystream $D_{SC}^{Al}[E^G(KS)]$ encrypted with respect to the key information Al of another smart card, the tape is determined as the recording tape of back-up copy function.

Accordingly, copy protection processor 4 transports to ATV decoder 2 the bitstream (BS) in the case of a general recording tape, and the bitstream $S_{KS}(BS)+IDX$ with keystreams $E^G(KS)$ split in the case of the recording tape of back-up copy function (S109).

Copy protection processor 4 transports to smart card 3 the encrypted keystream $D_{SC}^{Ak}[E^G(KS)]$ encrypted twice by the encryption algorithm $E^{SC}_{AK}(\bullet)$ with respect to its own key information Ak if the back-up copy function is adopted during the playback of the recording tape of copy protection function (S111, S112 and S113). Also, copy protection processor 4 transports to smart card 3 the encrypted keystream $E_{SC}^{Ak}[E^G(KS)]$ obtained by encrypting keystream $E^G(KS)$ by the encryption algorithm $E^{SC}_{AK}(\bullet)$ with respect to its own key information Ak if the back-up copy function is not adopted (S112 and S113).

While the above-described operations are performed by copy protection processor 4, smart card 3 performs the operations of the signal flow as shown in FIG. 20. To be detail, smart card 3 determines whether an index code IDX or keystream $E^G(KS)$ is input from ATV decoder 2 or not, by performing broadcasting or playback operation (S114 and S115).

At this time, if the keystream $E^G(KS)$ is input instead of the index code IDX, smart card 3 having determined the broadcasting view of PPV function decrypts the keystream $E^G(KS)$ by decryption algorithm $D^G(\bullet)$ with respect to the bitstream GA (S116) and inputs the key information KS to ATV decoder 2 (S117).

Accordingly, ATV decoder 2 reads the key information KS of smart card 3, determines a descrambling method and descrambles the bitstream $S_{KS}(BS)$ to output analog video and audio signals, thereby allowing a viewer to watch the broadcasting program.

If it is determined that the index code IDX is input in S115, smart card 3 decrypts the keystream $E_{SC}^{Ak}[E^G(KS)]$ input from copy protection processor 4 by decryption algorithm $D^{SC}_{AK}(\bullet)$ with respect to the key information Ak (S118) and then determines whether the operation is a playback operation or a recording operation (S119).

At this time, if it is determined that the operation is the playback operation in S119, smart card 3 decrypts the keystream $E^G(KS)$ by decryption algorithm $D^G(\bullet)$ with respect to the bitstream GA (S116) and inputs the key information KS to ATV decoder 2 (S117).

Accordingly, ATV decoder 2 reads the key information KS of smart card 3, determines a descrambling method and descrambles the bitstream $S_{KS}(BS)$ split in copy protection processor 4 by the determined descrambling method to output analog video and audio signals, thereby allowing a viewer to watch the recorded program of the tape.

If it is determined that the operation is the recording operation in S119, smart card 3 determines whether the function is the back-up copy function or not (S120). If the function is the back-up copy function, the keystream $E^G(KS)$ by decryption algorithm $D^{SC}{}_{Ak}(\bullet)$ with respect to the key information Ak (S121), and then the decrypted keystream $D^{SC}{}_{Ak}[E^G(KS)]$ by decryption algorithm $D^{SC}{}_{Ak}(\bullet)$ with respect to the key information Al (S122).

At this time, the keystream $D^{SC}{}_{Ak}\{D^{SC}{}_{Al}[E^G(KS)]\}$ decrypted in smart card 3 is transported to recording side (S123) and is input to copy protection processor 8 through smart card 7 (S124) to then be encrypted by encryption algorithm $E^{SC}{}_{Al}(\bullet)$.

Accordingly, smart card 7 inserts the encrypted keystream $D^{SC}{}_{Ak}[E^G(KS)]$ into a position designated by the index code IDX and mixes the same with the bitstream $S_{KS}(BS)$ output from copy protection processor 4 of playback side to then be recorded onto the tape in VCR 9.

If it is determined that the operation is the recording operation in S119, and it is determined in S120 that the PPP function is adopted, instead of the back-up copy function ), smart card 3 decrypts the keystream $E^G(KS)$ by decryption algorithm $D^{SC}{}_{Al}(\bullet)$ with respect to the key information Al (S122) and transports the decrypted key information $D^{SC}{}_{Al}[E^G(KS)]$ to recording side (S123).

At this time, copy protection processor 8 of recording side, having received the keystream $D_{SC}{}^{Al}[E^G(KS)]$ through smart card 7 encrypts the received keystream $D_{SC}{}^{Al}[E^G(KS)]$ by the encryption algorithm $E^{SC}{}_{Al}(\bullet)$ and inserts the encrypted keystream $[E^G(KS)]$ into a position designated by the index code IDX, thereby mixing with the bitstream $S_{KS}(BS)$ output from copy protection processor 4 of playback side. Therefore, the bitstream $S_{KS}(BS)+E^G(KS)$ output from copy protection processor 8 is recorded onto the tape by VCR 9.

As described above, in the present invention, all smart cards have common algorithm and common key with respect to encryption algorithm $E^G(\bullet)$ and decryption algorithm $D^G(\bullet)$ for the MPEG bitstream.

Also, the encryption algorithm $E^{SC}{}_{Al}(\bullet)$ and decryption algorithm $D^{SC}{}_{Ak}(\bullet)$ for a smart card are common for all smart card. However, key information is different for the respective smart cards.

In other words, each smart card contains an authentication key corresponding to its own identification (ID) in itself.

In performing such operation, the initialization including an authentication process for identify their counterpart between the copy protection processor and the smart card, and between the smart cards and a key exchange process is necessary.

At this time, as the authentication process, there has been proposed various methods such as a method of using symmetrical key algorithm like a DES algorithm, a method of using a public key algorithm like an RSA, or a method of using Fiat-Shamir (FS) scheme.

In the present invention, the public key algorithm is used in the authentication process and the key exchange method are illustrated in FIG. 21. Such methods are adopted on the basis that a public key (n, e) is shared by a key reception means 201 and a key transport means 202.

At this time, key reception means 201 is a copy protection processor or a smart card 1 of recording side, and key transport means 202 is its own smart card k.

The embodiment of the present invention operating as shown in the above flowchart will now be described with reference to FIGS. 12 through 18.

In the present invention, as shown in FIG. 11A, if non-scrambled bitstream BS is transported, the circuit operates as shown in FIG. 12. Therefore, the bitstream modulated/demodulated and RS-decoded in demodulator & error corrector 1 is decrypted in ATV decoder 2, thereby outputting analog video and audio signals.

At this time, during recording operation, the bitstream BS output from demodulator & error corrector 1 is recorded onto the tape in VCR 5 through copy protection processor 4. During playback operation, the bitstream BS played back from VCR 5 is input to ATV decoder 2 through copy protection processor 4 and is decrypted, thereby outputting analog video and audio signals.

In other words, since the data is not generated from copy protection processor 4 to smart card 3, the view and copy are not affected.

As shown in FIGS. 11B and 11C, if scrambled bitstream is input, the CA function is adopted to perform the operations shown in FIGS. 13 through 18.

First, in case of performing the PPV function, the circuit operates as shown in FIG. 13. That is to say, if scrambled bitstream $S_{KS}(BS)$ and encrypted keystream $E^G(KS)$ are transported, demodulator & error corrector 1 demodulates the modulated input signal and then corrects the errors generated during transport through RS-decoding.

At this time, ATV decoder 2 splits the keystream $E^G(KS)$ from the output $S_{KS}(BS)+E^G(KS)$ of demodulator & error corrector 1 and outputs the same to smart card 3. Then, smart card 3 decrypts the encrypted keystream $E^G(KS)$ and outputs again the keystream KS to ATV decoder 2.

Accordingly, ATV decoder 2 reads the key information KS of smart card 3, determines a descrambling method and descrambles the bitstream $S_{KS}(BS)$ to output analog video and audio signals.

As described above, smart card 3 shown in FIG. 9 allows processor 11 to decrypt the encrypted keystream $E^G(KS)$ and to output the decrypted keystream KS to ATV decoder 2 by decryption algorithm $E^G(\bullet)$.

In the case of recording scrambled bitstream for the first time, the circuit operates as shown in FIG. 14, in which the transported bitstream $S_{KS}(BS)+E^G(KS)$ is error-corrected in demodulator & error corrector 1 through RS-decoding and then is input to VCR 5 through copy protection processor 4 to then be recorded onto the tape.

In the case of playing back the bitstream recorded as described above, if the function is PPP function, the system operates as shown in FIG. 15. If the bitstream $S_{KS}(BS)+E^G(KS)$ played back from VCR 5 is input to copy protection processor 4, copy protection processor 4 splits the played-back bitstream $S_{KS}(BS)+E^G(KS)$ into the bitstream $S_{KS}(BS)$ and keystream $E^G(KS)$ and then again encrypts the split keystream $E^G(KS)$ by encryption algorithm $E^{SC}{}_{Ak}(\bullet)$ to then output the same to smart card 3. The split bitstream $S_{KS}(BS)$ is output to ATV decoder 2 with the extracted portion of the keystream $E^G(KS)$ inserted with an index code IDX.

At this time, smart card 3 having received the index code IDX through ATV decoder 2, decrypts the encrypted keystream $E^{SC}_{Ak}[E^G(KS)]$ of copy protection processor 2 by decryption algorithm $D^{SC}_{Ak}(\bullet)$ for smart card and outputs the key stream (descrambling information) KS to ATV decoder 2 (S117).

Accordingly, ATV decoder 2 reads the key stream KS of smart card 3, determines a descrambling method and decrypts the bitstream $S_{KS}(BS)$ input through copy protection processor 4, thereby outputting analog video and audio signals.

Figure 16:
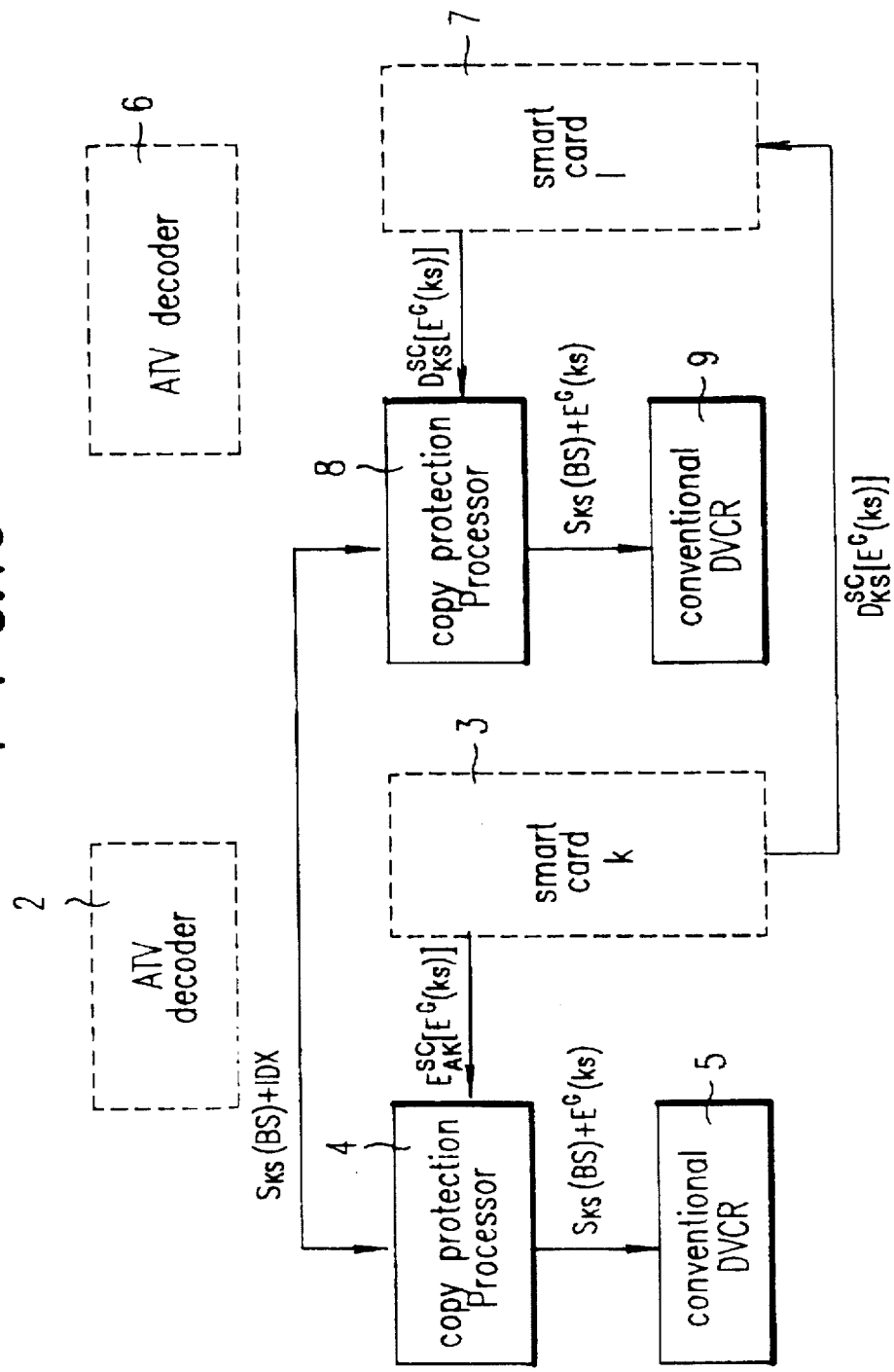

Also, in the case of recording the data recorded as shown in FIG. 14 onto a different VCR, the PPC function is performed as shown in FIG. 16. If the bitstream $S_{KS}(BS)+E^G(KS)$ played back from VCR 5 is input to copy protection processor 4, copy protection processor 4 splits the bitstream $S_{KS}(BS)+E^G(KS)$ into the bitstream $S_{KS}(BS)$ and keystream $E^G(KS)$ and then again encrypts the split keystream $E^G(KS)$ by encryption algorithm $E^{SC}_{Ak}(\bullet)$ to then output the same to smart card 3. The split bitstream $S_{KS}(BS)$ is output to copy protection processor 8 of recording side with the extracted portion of the keystream $E^G(KS)$ inserted with the index code IDX.

At this time, smart card 3 of playback side decrypts the keystream $E^{SC}_{Ak}[E^G(KS)]$ encrypted in copy protection processor 4 by decryption algorithm $D^{SC}_{Ak}(\bullet)$ with respect to the key information Al stored in RAM 15 and then outputs the decrypted keystream $D^{SC}_{Al}[E^G(KS)]$ to smart card 7 of recording side.

Accordingly, if smart card 7 of recording side receives the keystream $D^{SC}_{Al}[E^G(KS)]$ of smart card 3 of playback side and outputs the same to copy protection processor 8, copy protection processor 8 encrypts the keystream $D^{SC}_{Al}[E^G(KS)]$ and restores the same into the original encrypted keystream $E^G(KS)$, which is mixed with the bitstream $G_{KS}(BS)$ output from copy protection processor 4 of playback side according to the index code IDX to then be output to VCR 9, thereby recording the same onto another tape.

The data of the tape recorded in the above-described operations adopts the PPP function and is played back as shown in FIG. 15.

Figure 17:
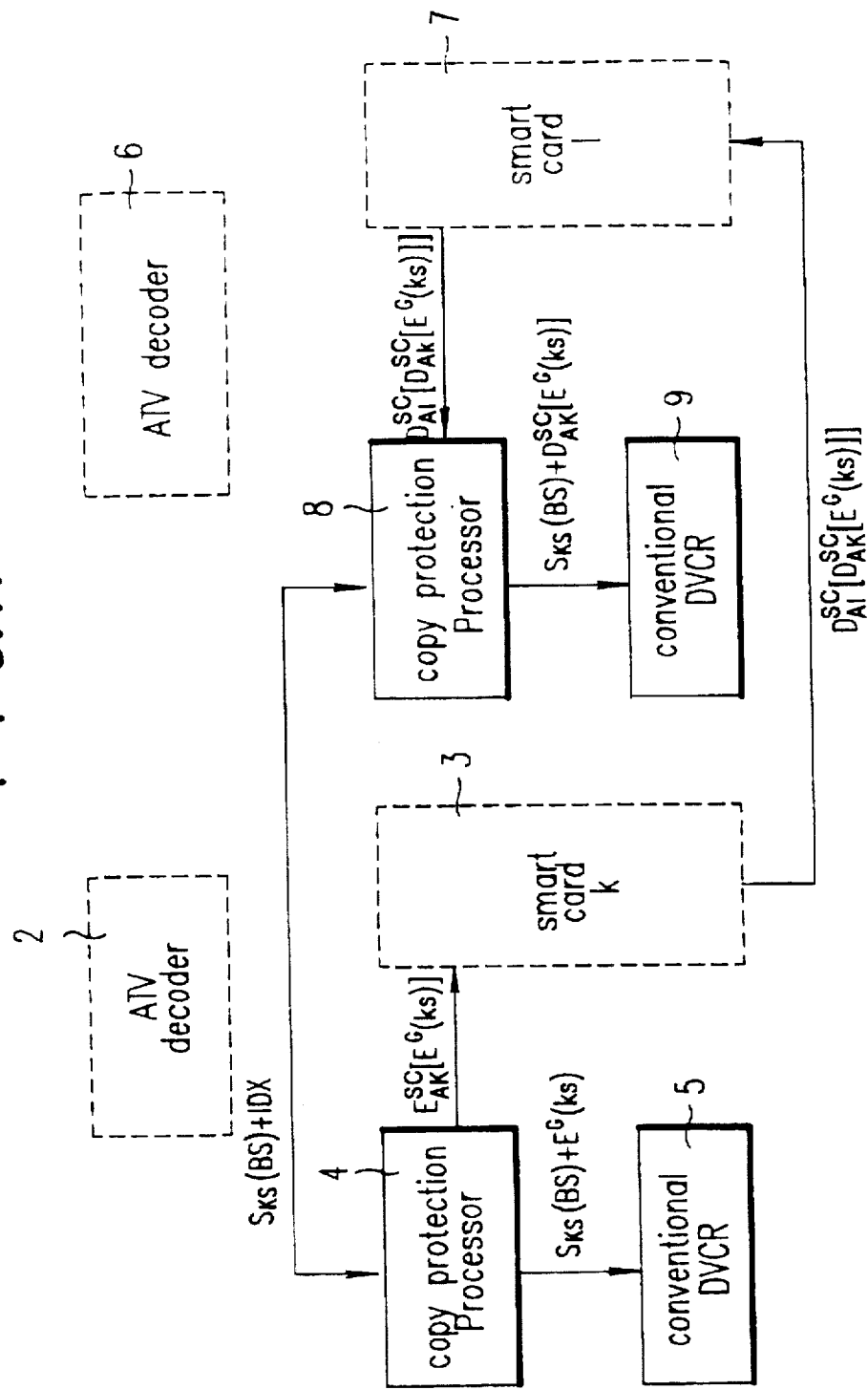

Also, in the case of recording the data recorded as shown in FIG. 14 onto another VCR, the back-up copy function is performed as shown in FIG. 17.

In other words, if the bitstream $S_{KS}(BS)+E^G(KS)$ played back from VCR 5 is input to copy protection processor 4, copy protection processor 4 splits the bitstream $S_{KS}(BS)+E^G(KS)$ into the bitstream $S_{KS}(BS)$ and keystream $E^G(KS)$ and then again encrypts the split keystream $E^G(KS)$ by encryption algorithm $E^{SC}_{Ak}(\bullet)$ to then output the same to smart card 3. The split bitstream $S_{KS}(BS)$ is output to copy protection processor 8 of recording side with the extracted portion of the keystream $E^G(KS)$ inserted with the index code IDX.

At this time, smart card 3 of playback side decrypts twice the keystream $E^{SC}_{Ak}[E^G(KS)]$ encrypted in copy protection processor 4 by decryption algorithm $D^{SC}_{Al}(\bullet)$ with respect to its own key information Ak stored in ROM 14 and then decrypts again by decryption algorithm $D^{SC}_{Al}(\bullet)$ with respect to the key information Al stored in RAM 15 and then outputs the decrypted keystream $D^{SC}_{Al}\{D^{SC}_{Ak}[E^G(KS)]\}$ to smart card 7 of recording side.

Accordingly, if the keystream $D^{SC}_{Al}\{D^{SC}_{Ak}[E^G(KS)]\}$ of smart card 3 of playback side is output to copy protection processor 7 of recording side through smart card 7 of recording side, copy protection processor 8 encrypts the keystream $D^{SC}_{Al}\{D^{SC}_{Ak}[E^G(KS)]\}$ with respect to the key information Al and restores the same into the original encrypted keystream $D^{SC}_{Ak}[E^G(KS)]$. The restored $D^{SC}_{Ak}[E^G(KS)]$ is mixed with the bitstream $G_{KS}(BS)$ output from copy protection processor 4 of playback side according to the index code IDX to then be output to VCR 9, thereby recording the same onto another tape.

Here, the charge is counted in the improved smart card 3 or 7.

The data recorded by performing the back-up copy function can be played back only from the VCR recording the original tape. In the case of a normal playback, the operation is executed as shown in FIG. 18A.

In other words, if the bitstream $S_{KS}(BS)+D^{SC}_{Ak}[E^G(KS)]$ played back from VCR 5 is input to copy protection processor 4, copy protection processor 4 splits the bitstream $S_{KS}(BS)+D^{SC}_{Ak}[E^G(KS)]$ into the bitstream $S_{KS}(BS)$ and keystream $D^{SC}_{Ak}[E^G(KS)]$ and then again encrypts twice the split keystream $D^{SC}_{Ak}[E^G(KS)]$ by encryption algorithm $E^{SC}_{Ak}(\bullet)$ to then output the same to smart card 3. The split bitstream $S_{KS}(BS)$ is output to ATV decoder 2 with the extracted portion of the keystream $D^{SC}_{Ak}[E^G(KS)]$ inserted with the index code IDX.

At this time, smart card 3 having received the index code IDX through ATV decoder 2 decrypts twice the keystream $E^{SC}_{Ak}[E^G(KS)]$ encrypted in copy protection processor 2 by decryption algorithm $D^{SC}_{Ak}(\bullet)$ for smart card and then outputs the key stream (descrambling information) KS to ATV decoder 2.

Accordingly, ATV decoder 2 reads the key stream KS of smart card 3, determines a descrambling method and decrypts the bitstream $S_{KS}(BS)$ input through copy protection processor 4, thereby outputting analog video and audio signals.

Also, in the case of an abnormal playback to another VCR not to the original recorded VCR, the operation is executed as shown in FIG. 18B, thereby disabling the playback of the tape.

In other words, if the copied tape is played back from VCR to which the tape copy has been performed, copy protection processor 8 splits the played-back data $S_{KS}(BS)+D^{SC}_{Ak}[E^G(KS)]$ to separate the bitstream $S_{KS}(BS)+IDX$.

At this time, the split bitstream $D^{SC}_{Ak}[E^G(KS)]$ is encrypted with respect to its own key information Al and is again encrypted with respect to the key information Al to become $E^{SC}_{Al}\{E^{SC}_{Al}(D^{SC}_{Ak}[E^G(KS)])\}$ to then be transported to smart card 7.

At this time, smart card 7 cannot decrypt the keystream $E^{SC}_{Al}\{E^{SC}_{Al}(D^{SC}_{Ak}[E^G(KS)])\}$, so that the key information KS may not be transported to ATV decoder 6.

Accordingly, smart card 7 cannot descrambles the bitstream $S_{KS}(BS)$ so that the copied tape cannot be played back.

As described above, according to the present invention, since the authentication and key exchange process are automatically performed during power-on or connection between DVCRs, the illegal view and copy protection function for illegal smart card can be automatically performed. Also, since the illegal view and copy protection is partially performed, the scrambling process is performed with respect to a protection desired portion of a program, thereby performing the illegal view and copy protection automatically and levying the charge in a desirable manner.

Also, in the present invention, since the split bitstream and keystream are transported to different paths, the protection data amount can be reduced, thereby efficiently performing the illegal view and copy protection. In implementing the illegal view protection and illegal copy protection for a smart card, the PPV, PPP, PPC and back-up copy functions are differentiated, thereby levying the charges differentially for the respective functions.

According to the present invention, the copy protection for digital signals, which is adoptable for DSM applications can be implemented, which allows a program copyright protection for a DSM such as a DVCR. Therefore, the reliability for illegal view and copy protection is increased.

Finally, in order to facilitate the understanding of the present invention, terms used in the specification will be defined as follows:

1) BS: non-scrambled GA bitstream;

2) $KS=[K_0, K_1, K_2, \ldots K_i, \ldots K_n]$: keystream (Here, n is total number of keys used for scrambling.);

3) $BS=[BS_0, BS_1, BS_2, \ldots BS_i, \ldots BS_n]$: bitstream (Here, $BS_i$ is one segment of BS and is a scrambling unit.);

4) $S_{KS}(BS)=[S_{K0}(BS_0), S_{K1}(BS_1), S_{K2}(BS_2), \ldots S_{Ki}(BS_i), \ldots S_{Kn}(BS_n)]$: scrambled GA bitstream;

5) $E(\bullet)\&D(\bullet)$: algorithms used for encryption and decryption of keys in GA; $E^G(KS)=[E^G(K_0), E^G(K_1), E^G(K_2), \ldots E^G(K_i), \ldots E^G(K_n)]$ and $D^G[E^G(KS)]=[D^G[E^G(K_0)], D^G[E^G(K_1)], D^G[E^G(K_2)], \ldots D^G[E^G(K_i)], \ldots D^G[E^G(K_n)]]=KS$;

6) $IDS=[0, 1, 2, \ldots i, \ldots n]$: index stream;

7) Ak: authentication key for smart card (k); and

8) $E^{SC}_A(\bullet)\&D^{SC}_A(\bullet)$: encryption and decryption algorithms for smart card used the smart card authentication key (A) as the key.

What is claimed is:

1. An illegal view and copy protection method in a digital video system comprising:

a determination step for determining received data of having been scrambled;

a reproduction step, if the received data was determined to be scrambled data in the determination step, splitting the scrambled data into a bitstream and a keystream for decrypting the split keystream for reading in key information, and descrambling the split bitstream according to the read in key information for displaying the bitstream on a display;

a recording step for, if the received data was determined to be scrambled data in the determination step, recording the scrambled data on a recording medium either as scrambled data of a bitstream and a keystream according to a recording or copying mode, or after splitting the scrambled data into a bitstream and a keystream, encrypting the split keystream, and mixing the encrypted keystream with the bitstream; and a transporting step, if the received data was determined to be scrambled data in the determination step, splitting the scrambled data into a bitstream and a keystream for transporting the split keystream either after decrypting the split keystream with respect to key information from recording side according to a pay-per-copy mode or a back-up copy mode, or after decrypting the split keystream two times with respect to key information of said keystream's and key information from recording side;

thereby the reproduction step, the recording step and the transporting step can be performed simultaneously or selectively.

2. An illegal view and copy protection method in a digital video system as claimed in claim 1, wherein, if the received data was determined to be partially scrambled data in the determination step, said illegal view and copy protection method is applied only to the partially scrambled data.

3. An illegal view and copy protection method in a digital video system as claimed in claim 1, wherein the reproduction step includes the step of decrypting said split keystream with a decryption algorithm, for reading in key information.

4. An illegal view and copy protection method in a digital video system as claimed in claim 1, wherein a copying operation in the recording step includes, a first step for encrypting the key stream with respect to said keystream's key information, a second step for determining the encrypted keystream of being a back-up copy mode or a pay-per-copy mode, a third step for, if the mode was determined to be the pay-per-copy mode in the first step, encrypting the keystream transported after being decrypted with respect to the key information from a recording side, and then inserting the same into a position corresponding to an index code to record the same together with the bitstream, and a fourth step for, if the mode is determined to be the back-up copy mode in the second step, encrypting the keystream transported after being decrypted with respect to said keystream's key information and the key information from a recording side with respect to the key information from a recording side, decrypting the same with respect to said keystream's key information, and then inserting the same into a position corresponding to an index code, to record the same together with the bitstream.

5. An illegal view and copy protection method in a digital video system as claimed in claim 4, wherein said pay-per-copy mode operation the third step includes, a first transportation step for transporting the scrambled data after splitting the bitstream and the keystream and inserting said index code into the split portion of said keystream, a second transportation step for transporting the keystream split in the first transportation step after encrypting the keystream with respect to said keystream's key information and decrypting the same with respect to the key information from a recording side, a recording step for recording the keystream transported in the second transportation step on a recording medium after encrypting the keystream with respect to the key information from a recording side in correspondence with the index code and mixing the same with the bitstream transported in the first transportation step.

6. An illegal view and copy protection method in a digital video system as claimed in claim 5, wherein the reproduction operation after finish of the recording step includes, a splitting step for splitting the reproduced bitstream into a bitstream and a keystream and inserting an index code into the split portion of the keystream, an encrypting step for encrypting the keystream split in the splitting step with respect to said keystream's key information, a reading in step for reading in key information by decrypting the keystream encrypted in the encrypting step, with respect to said keystream's key information, and a decrypting step for descrambling the bitstream split according to the key information read in in the reading in step.

7. An illegal view and copy protection method in a digital video system as claimed in claim 4, wherein said back-up copy mode operation in the fourth step includes,
- a first transportation step for transporting the scrambled data after splitting the scrambled data into a bitstream and a keystream and inserting an index code into the split portion of the keystream,
- a second transportation step for transporting the keystream split in the first transportation step after encrypting the keystream with respect to said keystream's key information and decrypting the encrypted keystream with respect to the key information from a recording side and said keystream's key information,
- a recording step for recording the keystream transported in the second transportation step on a recording medium after encrypting the keystream with respect to the key information from a recording side in correspondence with the index code and mixing the same with the bitstream transported in the first transportation step.

8. An illegal view and copy protection method in a digital video system as claimed in claim 7, wherein the reproduction operation after finish of the recording step includes,
- a splitting step for splitting the reproduced bitstream into a bitstream and a keystream and inserting an index code into the split portion of the keystream,
- an encrypting step for encrypting the keystream split in the splitting step with respect to said keystream's key information,
- a reading in step for reading in key information by decrypting the keystream encrypted for two times in the encrypting step, with respect to said keystream's key information and the MPEG bitstream, and
- a decrypting step for descrambling the bitstream split according to the key information read in in the reading in step.

9. An illegal view and copy protection method in a digital video system comprising:
- a reproduction step, on reception of scrambled data, splitting the scrambled data into a bitstream and a keystream for decrypting the split keystream for reading in key information, and descrambling the split bitstream according to the read in key information for displaying the bitstream on a display; and,
- a recording step for, on reception of scrambled data, recording the scrambled data on a recording medium as scrambled data of a bitstream and a keystream;

thereby the reproduction step and the recording step can be performed simultaneously or selectively.

10. An illegal view and copy protection method in a digital video system as claimed in claim 9, wherein the reproduction step includes the steps of decrypting said split keystream with a decryption algorithm for reading in key information and determining a descrambling method with the read in key information.

11. An illegal view and copy protection method in a digital video system as claimed in claim 9, wherein the reproduction operation after finish of the recording step includes,
- a splitting step for splitting the reproduced bitstream into a bitstream and a keystream and inserting an index code into the split portion of the keystream,
- an encrypting step for encrypting the keystream split in the splitting step according to an encrypting algorithm with respect to said keystream's key information,
- a reading in step for reading in key information by decrypting the keystream encrypted for two times in the encrypting step, with respect to said keystream's key information, and
- a decrypting step for descrambling the bitstream split according to the key information read in in the reading in step for displaying on a display.

12. An illegal view and copy protection method in a digital video system on reception of a keystream encrypted with respect to said keystream's key information at copying, comprising:
- a determining step for determining the mode of the keystream being a back-up copy mode or a pay-per-copy mode;
- a first transportation step for, if the mode was determined to be a PPC mode in the determining step, decrypting the keystream with respect to key information from a recording side for transporting the keystream;
- a first recording step for encrypting the keystream transported in the first transportation step with respect to the key information from the recording side and inserting the encrypted keystream into a position corresponding to an index code, for recording the keystream together with a bitstream on a recording medium;
- a second transportation step for, if the mode was determined to be a back-up copy mode in the determining step, decrypting the keystream for two times with respect to said keystream's key information and the key information from the recording side for transporting the keystream; and
- a second recording step for encrypting the keystream transported in the second transportation step with respect to the key information from the recording side and inserting the encrypted keystream into the position corresponding to the index code, for recording the keystream together with the bitstream on a recording medium.

13. An illegal view and copy protection method in a digital video system as claimed in claim 12, wherein the first transportation step includes the steps for decrypting the keystream, encrypted with respect to said keystream's key information, with respect to said keystream's key information and decrypting the keystream again with respect to the key information from the recording side, for transporting the keystream.

14. An illegal view and copy protection method in a digital video system as claimed in claim 12, wherein the second transportation step includes the step for decrypting the bitstream, decrypted with respect to said keystream's key information, for two times with respect to said keystream's key information and decrypting the keystream again with respect to the key information from the recording side for transporting the keystream.

15. An illegal view and copy protection method in a digital video system, comprising:
- a pay-per-copy mode reproduction step for having determined the recording medium being a pay-per-copy recording medium on detection of a keystream at reproduction from a recording medium, encrypting the keystream with respect to said keystream's key information and decrypting the keystream with respect to said keystream's key information for reading in the key information, for descrambling the bitstream using both the read in key information and an index code; and,
- a 'back-up copy' mode reproduction step for, having determined the recording medium being a 'back-up copy' recording medium on detection of a keystream decrypted with respect to said keystream's information at reproduction from a recording medium, encrypting the keystream for two times with respect to said keystream's key information and the key information from a recording side and decrypting the keystream with respect to said keystream's key information for reading in the key information, for descrambling the bitstream using both the read in key information and an index code.

16. An illegal view and copy protection device in a digital video system, comprising:

demodulating & error correcting means for demodulating a broadcasting signal and Reed Solomon decoding said signal;

copy protection processing means for transporting the output of said demodulating & error correcting means to a digital recording/reproduction device, splitting the scrambled recording signal reproduced from said digital recording/reproduction device into a bitstream and a keystream, and encrypting the split keystream;

decoding means for descrambling the bitstream from said demodulating & error correcting means or the copy protection processing means according to descrambling information; and, a smart card for decrypting the encrypted keystream of said copy protection processing means for applying to said decoding means as descrambling information.

17. An illegal view and copy protection device in a digital video system as claimed in claim 16, wherein said illegal view protection function is performed such that said decoding means connected to said demodulating & error correcting means is connected to said smart card to decode the keystream of said decoding means and the descrambling information is output to said decoding means.

18. An illegal view and copy protection device in a digital video system as claimed in claim 16, wherein first recording is performed by connected said copy protection processing means connected to said demodulating & error correcting means to said digital recording/reproduction device.

19. An illegal view and copy protection device in a digital video system as claimed in claim 16, wherein the illegal reproduction protection is performed such that a keystream line of said copy protection processing means connected to said digital recording/reproduction device is connected to said smart card, a bitstream line is connected to said decoding means, and said copy protection processing means and said decoding means are connected to each other, so that said smart card decrypts the keystream of said copy protection processing means into its own key information corresponding to the index code of said decoding means to then output the same to said decoding means.

20. An illegal view and copy protection device in a digital video system as claimed in claim 19, wherein said protection processing means encrypts twice the keystream split from reproduced data of said digital recording/reproduction during reproduction from a recording medium in a pay-per-copy mode with respect to said keystream's key information and transports the same to said smart card.

21. An illegal view and copy protection device in a digital video system as claimed in claim 19, wherein said protection processing means encrypts the keystream split from played-back data of said digital recording/reproduction device for more than two times during reproduction from a recording medium in back-up copy mode with respect to said keystream's key information and transports the same to said smart card.

22. An illegal view and copy protection device in a digital video system as claimed in claim 16, wherein said copy protection processing means includes:

a RAM for storing intrinsic key information of said smart card, an algorithm storage memory for storing an encryption algorithm, and a processor for executing an encryption program of said algorithm storage memory with the key information of said RAM.

23. An illegal view and copy protection device in a digital video system as claimed in claim 16, wherein said smart card includes:

a first algorithm storage memory for storing a decryption algorithm program for a bitstream, a second algorithm storage memory for storing said smart card's decryption algorithm program, a ROM for storing said smart card's key information, and a RAM for temporarily storing key information of another smart card.

24. An illegal view and copy protection device in a digital video system comprising:

first copy protection processing means for splitting reproduction data from a first digital recording/reproduction device into a bitstream and a keystream and encrypting the split keystream;

first and second smart cards for decrypting encrypted keystream from said first copy protection processing means with respect to said keystream's key information and the key information from a recording side; and, second copy protection processing means for encrypting the keystream from the first smart card transported through the second smart card with respect to said keystream's key information and transporting the encrypted keystream together with the split bitstream to a second digital recording/reproduction device, for recording on a recording medium.

25. An illegal view and copy protection device in a digital video system as claimed in claim 24, wherein said first copy protection processing means encrypts the keystream with respect to said keystream's key information and transports the same to said first smart card.

26. An illegal view and copy protection device in a digital video system as claimed in claim 24, wherein said smart card decrypts the keystream of said first copy protection processing means with respect to said keystream's key information and the key information of recording side and then transports the same to said second smart card.

27. An illegal view and copy protection device in a digital video system as claimed in claim 24, wherein said second copy protection processing means encrypts the keystream transported from said second smart card with respect to said keystream's key information and mixes the same with the bitstream from said first copy protection processing means.

28. An illegal view and copy protection device in a digital video system as claimed in claim 24, wherein said first smart card decrypts the keystream from said first copy protection processing means twice with respect to said keystream's key information during a back-up copy mode and decrypts the same with respect to the key information from a recording side.

29. An illegal view and copy protection device in a digital video system as claimed in claim 24, wherein said second copy protection processing means encrypts the keystream transported from said second smart card with respect to said keystream's key information and mixes the encrypted keystream with the bitstream.

30. An illegal view and copy protection device in a digital video system as claimed in claim 24, wherein each of said first and second copy protection processing means includes a RAM for storing intrinsic key information of said smart card, an algorithm storage memory for storing an encryption algorithm, and a processor for executing an encryption program of said algorithm storage memory with the key information of said RAM.

31. An illegal view and copy protection device in a digital video system as claimed in claim 24, wherein each of said first and second smart cards includes a first algorithm storage memory for storing a decryption algorithm program for a bitstream, a second algorithm storage memory for storing said keystream's decryption algorithm program, a ROM for storing said keystream's key information, and a RAM for temporarily storing key information of another smart card.

32. An illegal view and copy protection device in a digital video system as claimed in claim 18, wherein said copy protection processing means includes:

a RAM for storing intrinsic key information of said smart card, an algorithm storage memory for storing an encryption algorithm, and a processor for executing an encryption program of said algorithm storage memory with the key information of said RAM.

33. An illegal view and copy protection device in a digital video system as claimed in claim 19, wherein said copy protection processing means includes:

a RAM for storing intrinsic key information of said smart card, an algorithm storage memory for storing an encryption algorithm, and a processor for executing an encryption program of said algorithm storage memory with the key information of said RAM.

34. An illegal view and copy protection device in a digital video system as claimed in claim 17, wherein said smart card includes:

a first algorithm storage memory for storing a decryption algorithm program for a bitstream, a second algorithm storage memory for storing said smart card's decryption algorithm program, a ROM for storing said smart card's key information, and a RAM for temporarily storing key information of another smart card.

35. An illegal view and copy protection device in a digital video system as claimed in claim 19, wherein said smart card includes:

a first algorithm storage memory for storing a decryption algorithm program for a bitstream, a second algorithm storage memory for storing said smart card's decryption algorithm program, a ROM for storing said smart card's key information, and a RAM for temporarily storing key information of another smart card.

* * * * *